(12) United States Patent
Bessone et al.

(10) Patent No.: US 11,504,664 B2
(45) Date of Patent: Nov. 22, 2022

(54) ADAPTER AND AIR FILTER CARTRIDGE BEING ADAPTED FOR USE WITH SUCH AN ADAPTER

(71) Applicant: Donaldson Company, Inc., Minneapolis, MN (US)

(72) Inventors: Sebastien Olivier Bessone, Asnieres-sur-Seine (FR); Paul Gerard Gallais, Paris (FR); Frederic Jean Jordi Miralles, Courbevoie (FR)

(73) Assignee: Donaldson Company, Inc., Minneapolis, MN (US)

( * ) Notice: Subject to any disclaimer, the term of this patent is extended or adjusted under 35 U.S.C. 154(b) by 239 days.

(21) Appl. No.: 16/611,556

(22) PCT Filed: May 8, 2018

(86) PCT No.: PCT/US2018/031656
§ 371 (c)(1),
(2) Date: Nov. 7, 2019

(87) PCT Pub. No.: WO2018/208824
PCT Pub. Date: Nov. 15, 2018

(65) Prior Publication Data
US 2021/0187423 A1   Jun. 24, 2021

(30) Foreign Application Priority Data
May 9, 2017 (EP) ..................................... 17170112

(51) Int. Cl.
*B01D 46/00* (2022.01)
*B01D 46/24* (2006.01)
*B01D 39/16* (2006.01)

(52) U.S. Cl.
CPC ..... *B01D 46/0005* (2013.01); *B01D 39/1676* (2013.01); *B01D 46/009* (2013.01);
(Continued)

(58) Field of Classification Search
CPC ............ B01D 46/0005; B01D 39/1676; B01D 46/009; B01D 46/2414; B01D 2265/021;
(Continued)

(56) References Cited

U.S. PATENT DOCUMENTS 2,771,156 A   11/1956  Kasten et al.
2,887,177 A    2/1958  Mund et al.
(Continued)

FOREIGN PATENT DOCUMENTS

BE   1011567 A3   11/1989
DE   2947655       6/1980
(Continued)

OTHER PUBLICATIONS

International Search Report for International Application No. PCT/US2018/031656 dated Jul. 17, 2018 (4 pages).
(Continued)

*Primary Examiner* — Robert A Hopkins
*Assistant Examiner* — Qianping He
(74) *Attorney, Agent, or Firm* — Merchant & Gould P.C.

(57) ABSTRACT

An adapter (1) for use in a dedicated coupling system (2) for releasably coupling an air filter cartridge (20) and a housing (36) of a dedicated air filter assembly (34), the adapter (1) comprising: a first surface area (4) being rotatably coupleable with a housing-side coupling element (6) of the coupling system (2), and a second surface area (8) preferably being non-rotatably coupleable. Cartridges, components, features and methods are described.

44 Claims, 19 Drawing Sheets

(52) U.S. Cl.
CPC .... *B01D 46/2414* (2013.01); *B01D 2265/021* (2013.01); *B01D 2265/05* (2013.01); *B01D 2275/10* (2013.01)

(58) Field of Classification Search
CPC .................. B01D 2265/05; B01D 2275/10; B01D 46/00; B01D 46/24; B01D 39/16; B01D 2265/06; B01D 46/14
USPC ........................................................ 55/495
See application file for complete search history.

(56) References Cited

U.S. PATENT DOCUMENTS

| | | |
|---|---|---|
| 2,962,121 A | 3/1958 | Wilber |
| 2,945,559 A | 3/1959 | Buckman |
| 3,002,870 A | 10/1961 | Belgarde et al. |
| 3,019,854 A | 2/1962 | O'Bryant |
| 3,025,963 A | 3/1962 | Bauer |
| 3,048,959 A | 8/1962 | Lowther |
| 3,078,650 A | 2/1963 | Anderson et al. |
| 3,160,488 A | 12/1964 | Wilber |
| 3,169,844 A | 2/1965 | Young |
| 3,209,917 A | 10/1965 | Yelinek |
| 3,290,870 A | 12/1966 | Jensen |
| 3,342,021 A | 9/1967 | Yelinek et al. |
| 3,342,335 A | 9/1967 | Gamundi et al. |
| 3,354,012 A | 11/1967 | Forman et al. |
| 3,357,163 A | 12/1967 | Burger et al. |
| 3,413,780 A | 12/1968 | Amlott et al. |
| 3,423,909 A | 1/1969 | Bennett et al. |
| 3,452,519 A | 7/1969 | Bianchetta |
| 3,488,928 A | 1/1970 | Tarala |
| 3,584,439 A | 6/1971 | Gronholz |
| 3,616,618 A | 11/1971 | Gronholz et al. |
| 3,672,130 A | 6/1972 | Sullivan et al. |
| 3,676,242 A | 7/1972 | Prentice |
| 3,695,437 A | 10/1972 | Shaltis |
| 3,710,560 A | 1/1973 | Maddocks |
| 3,716,436 A | 2/1973 | Pall et al. |
| 3,841,953 A | 10/1974 | Lohkamp et al. |
| 3,878,014 A | 4/1975 | Melead |
| 4,006,000 A | 2/1977 | Tortorici et al. |
| 4,062,781 A | 12/1977 | Strauss et al. |
| 4,128,251 A | 12/1978 | Gaither et al. |
| 4,135,899 A | 1/1979 | Gauer |
| 4,158,449 A | 6/1979 | Sun et al. |
| 4,159,197 A | 6/1979 | Schuler et al. |
| 4,162,906 A | 7/1979 | Sullivan et al. |
| 4,211,543 A | 7/1980 | Tokar et al. |
| 4,222,755 A | 9/1980 | Grotto |
| 4,227,898 A | 10/1980 | Kamekawa et al. |
| 4,235,611 A | 11/1980 | Brownell |
| 4,238,540 A | 12/1980 | Presta |
| 4,261,710 A | 4/1981 | Sullivan |
| 4,278,455 A | 7/1981 | Nardi |
| 4,279,275 A | 7/1981 | Clarke et al. |
| 4,303,426 A | 12/1981 | Battis |
| 4,312,651 A | 1/1982 | Esaki et al. |
| 4,349,363 A | 9/1982 | Patel et al. |
| 4,350,509 A | 9/1982 | Alseth et al. |
| 4,364,751 A | 12/1982 | Copley |
| 4,402,830 A | 9/1983 | Pall |
| 4,410,427 A | 10/1983 | Wydeven |
| 4,452,616 A | 6/1984 | Gillingham et al. |
| 4,488,889 A | 12/1984 | McCarroll |
| 4,491,460 A | 1/1985 | Tokar |
| 4,498,915 A | 2/1985 | Witchell |
| 4,537,608 A | 8/1985 | Koslow |
| 4,588,426 A | 5/1986 | Virgille et al. |
| 4,589,983 A | 5/1986 | Wydevan |
| 4,600,420 A | 7/1986 | Wydeven et al. |
| 4,609,465 A | 9/1986 | Miller |
| 4,720,292 A | 1/1988 | Engel et al. |
| 4,728,423 A | 3/1988 | Kuwajima |
| 4,764,191 A | 8/1988 | Morelli |
| 4,801,383 A | 1/1989 | Hoffmann et al. |
| 4,818,261 A | 4/1989 | Beckon |
| 4,838,901 A | 6/1989 | Schmidt et al. |
| 4,925,469 A | 5/1990 | Clement et al. |
| 4,925,561 A | 5/1990 | Ishii et al. |
| 4,950,317 A | 8/1990 | Dottermans |
| 4,963,170 A | 10/1990 | Weber et al. |
| 4,999,108 A | 3/1991 | Koch et al. |
| 5,030,264 A | 7/1991 | Klotz et al. |
| 5,045,192 A | 9/1991 | Terhune |
| 5,049,326 A | 9/1991 | Matsumoto et al. |
| 5,064,458 A | 11/1991 | Machado |
| 5,071,456 A | 12/1991 | Binder et al. |
| 5,082,476 A | 1/1992 | Kahlbaugh et al. |
| 5,106,397 A | 4/1992 | Jaroszczyk et al. |
| 5,112,417 A | 5/1992 | Sayles |
| 5,116,499 A | 5/1992 | Deibel |
| 5,118,417 A | 6/1992 | Deibel |
| 5,120,337 A | 6/1992 | Benzler et al. |
| 5,125,941 A | 6/1992 | Ernst et al. |
| 5,137,557 A | 8/1992 | Behrendt et al. |
| 5,160,519 A | 11/1992 | Svensson et al. |
| 5,167,683 A | 12/1992 | Behrendt et al. |
| 5,211,846 A | 5/1993 | Kott et al. |
| 5,213,596 A | 5/1993 | Kume et al. |
| 5,222,488 A | 6/1993 | Forsgren |
| 5,238,476 A | 8/1993 | Svensson et al. |
| 5,250,179 A | 10/1993 | Spearman |
| 5,277,157 A | 1/1994 | Teich |
| 5,290,445 A | 3/1994 | Buttery |
| 5,350,515 A | 9/1994 | Stark et al. |
| 5,401,285 A | 3/1995 | Gillingham et al. |
| 5,415,677 A | 5/1995 | Ager et al. |
| 5,431,168 A | 7/1995 | Webster, Jr. |
| 5,435,870 A | 7/1995 | Takagaki et al. |
| 5,442,721 A | 8/1995 | Kalada et al. |
| 5,484,466 A | 1/1996 | Brown et al. |
| 5,487,767 A | 1/1996 | Brown |
| 5,494,497 A | 2/1996 | Lee |
| 5,522,909 A | 6/1996 | Haggard |
| 5,543,007 A | 8/1996 | Takagaki et al. |
| 5,545,241 A | 8/1996 | Vanderauwera et al. |
| 5,547,480 A | 8/1996 | Coulonvaux |
| 5,552,909 A | 9/1996 | Onisawa et al. |
| 5,556,440 A | 9/1996 | Mullins et al. |
| 5,562,825 A | 10/1996 | Yamada et al. |
| 5,575,826 A | 11/1996 | Gillingham et al. |
| 5,601,717 A | 2/1997 | Villette et al. |
| 5,605,555 A | 2/1997 | Patel et al. |
| 5,605,625 A | 2/1997 | Mills |
| 5,611,922 A | 3/1997 | Stene |
| 5,613,992 A | 3/1997 | Engel |
| 5,632,791 A | 5/1997 | Oussoren et al. |
| 5,645,718 A | 7/1997 | Hardison et al. |
| 5,683,479 A | 11/1997 | Gillingham et al. |
| 5,683,660 A | 11/1997 | Wirth et al. |
| 5,685,985 A | 11/1997 | Brown et al. |
| 5,690,712 A | 11/1997 | Engel |
| 5,700,304 A | 12/1997 | Foo |
| 5,720,788 A | 2/1998 | Puckett et al. |
| 5,720,790 A | 2/1998 | Kometani et al. |
| 5,730,768 A | 3/1998 | Kaminaga et al. |
| 5,730,769 A | 3/1998 | Dungs et al. |
| 5,736,040 A | 4/1998 | Duerrstein et al. |
| 5,740,774 A | 4/1998 | Kennedy |
| 5,741,421 A | 4/1998 | Erdmannsdoerfer et al. |
| 5,753,117 A | 5/1998 | Jiang |
| 5,755,842 A | 5/1998 | Patel et al. |
| 5,755,843 A | 5/1998 | Sundquist et al. |
| 5,755,844 A | 5/1998 | Arai et al. |
| 5,772,883 A | 6/1998 | Rothman et al. |
| D398,098 S | 7/1998 | Gillingham et al. |
| 5,792,247 A | 8/1998 | Gillingham et al. |
| D398,046 S | 9/1998 | Gillingham et al. |
| 5,800,581 A | 9/1998 | Gielink et al. |
| D399,944 S | 10/1998 | Gillingham et al. |
| 5,820,646 A | 10/1998 | Gillingham et al. |
| D401,306 S | 11/1998 | Ward |
| 5,853,439 A | 12/1998 | Gieseke et al. |

(56) References Cited

U.S. PATENT DOCUMENTS

| | | |
|---|---|---|
| 5,863,313 A | 1/1999 | Coulonvaux |
| 5,865,863 A | 2/1999 | DeSousa et al. |
| 5,882,367 A | 3/1999 | Morgan et al. |
| 5,893,937 A | 4/1999 | Moessinger |
| 5,895,574 A | 4/1999 | Friedmann et al. |
| 5,897,676 A | 4/1999 | Engel et al. |
| 5,902,364 A | 5/1999 | Tokar et al. |
| 5,916,435 A | 6/1999 | Spearman |
| 5,919,279 A | 7/1999 | Merritt et al. |
| 5,921,982 A | 7/1999 | Lesh et al. |
| 5,938,804 A | 8/1999 | Engel et al. |
| D414,544 S | 9/1999 | Ward et al. |
| 5,951,729 A | 9/1999 | Ernst et al. |
| 5,972,063 A | 10/1999 | Dudrey et al. |
| D416,308 S | 11/1999 | Ward et al. |
| D417,268 S | 11/1999 | Gillingham |
| 5,984,109 A | 11/1999 | Kanwar et al. |
| 6,004,366 A | 12/1999 | Engel et al. |
| 6,015,452 A * | 1/2000 | Nepsund .......... B01D 46/521 95/287 |
| 6,039,778 A | 3/2000 | Coulonvaux |
| 6,048,386 A | 4/2000 | Gillingham et al. |
| 6,051,042 A | 4/2000 | Coulonvaux |
| D425,189 S | 5/2000 | Gillingham et al. |
| D428,128 S | 7/2000 | Gillingham et al. |
| 6,090,177 A | 7/2000 | Moessinger et al. |
| 6,096,208 A | 8/2000 | Connelly et al. |
| 6,099,606 A | 8/2000 | Miller et al. |
| 6,146,527 A | 11/2000 | Oelschlaegel |
| 6,149,700 A | 11/2000 | Morgan et al. |
| 6,152,979 A | 11/2000 | Cappuyns |
| 6,171,275 B1 | 1/2001 | Webster, Jr. |
| 6,179,890 B1 | 1/2001 | Ramos et al. |
| D437,401 S | 2/2001 | Ramos et al. |
| 6,190,432 B1 | 2/2001 | Gieseke et al. |
| 6,210,469 B1 | 4/2001 | Tokar |
| 6,221,122 B1 | 4/2001 | Gieseke et al. |
| 6,231,630 B1 | 5/2001 | Ernst et al. |
| 6,235,195 B1 | 5/2001 | Tokar |
| 6,258,145 B1 | 7/2001 | Engel et al. |
| 6,261,334 B1 | 7/2001 | Morgan et al. |
| 6,290,739 B1 | 9/2001 | Gieseke et al. |
| 6,299,661 B1 | 10/2001 | Bloomer |
| 6,312,489 B1 | 11/2001 | Ernst et al. |
| 6,322,602 B2 | 11/2001 | Engel et al. |
| 6,348,084 B1 | 2/2002 | Tokar et al. |
| 6,348,085 B1 | 2/2002 | Tokar et al. |
| 6,350,291 B1 | 2/2002 | Gieseke et al. |
| 6,350,296 B1 | 2/2002 | Warner |
| 6,413,289 B2 | 2/2002 | Engel et al. |
| 6,368,374 B1 | 4/2002 | Tokar et al. |
| 6,383,244 B1 | 5/2002 | Wake et al. |
| 6,387,162 B1 | 5/2002 | Kosmider et al. |
| 6,391,076 B1 | 5/2002 | Jaroszczyk et al. |
| 6,398,832 B2 | 6/2002 | Morgan et al. |
| 6,402,798 B1 | 6/2002 | Kallsen et al. |
| 6,416,561 B1 | 7/2002 | Kallsen |
| 6,419,718 B1 | 7/2002 | Klug et al. |
| 6,436,162 B1 | 8/2002 | Wake et al. |
| 6,447,567 B1 | 9/2002 | Ehrenberg |
| 6,485,535 B1 | 11/2002 | Linnersten et al. |
| D467,654 S | 12/2002 | Klug et al. |
| 6,517,598 B2 | 2/2003 | Anderson et al. |
| 6,521,009 B2 | 2/2003 | Engel et al. |
| D471,623 S | 3/2003 | Gieseke et al. |
| 6,530,969 B2 | 3/2003 | Gieseke et al. |
| 6,537,339 B2 | 3/2003 | Schmitz et al. |
| 6,540,806 B2 | 4/2003 | Reinhold |
| 6,547,857 B2 | 4/2003 | Gieseke et al. |
| D475,129 S | 5/2003 | Ward et al. |
| 6,558,453 B2 | 5/2003 | Sepke et al. |
| 6,572,667 B1 | 6/2003 | Greif et al. |
| D477,659 S | 7/2003 | Gieseke et al. |
| 6,585,792 B2 | 7/2003 | Schneider et al. |
| 6,585,838 B1 | 7/2003 | Mullins et al. |
| 6,598,580 B2 | 7/2003 | Baumann et al. |
| 6,599,342 B2 | 7/2003 | Andress |
| 6,599,344 B2 | 7/2003 | Tokar et al. |
| 6,602,308 B1 | 8/2003 | Carle |
| 6,610,117 B2 | 8/2003 | Gieseke et al. |
| 6,610,126 B2 | 8/2003 | Xu et al. |
| D481,101 S | 10/2003 | Boehrs |
| 6,638,332 B1 | 10/2003 | Schmitz et al. |
| 6,652,614 B2 | 11/2003 | Gieseke et al. |
| D483,459 S | 12/2003 | DeWit et al. |
| 6,662,954 B2 | 12/2003 | Gottwald-Grill |
| D485,339 S | 1/2004 | Klug et al. |
| 6,673,136 B2 | 1/2004 | Gilingham et al. |
| 6,676,721 B1 | 1/2004 | Gillingham et al. |
| 6,706,087 B1 | 3/2004 | Gebler et al. |
| 6,726,735 B1 | 4/2004 | Oussoren et al. |
| 6,736,874 B2 | 5/2004 | Reiger |
| 6,743,317 B2 | 6/2004 | Wydeven |
| 6,746,518 B2 | 6/2004 | Gieseke et al. |
| 6,752,924 B2 | 6/2004 | Gustafson |
| 6,837,920 B2 | 1/2005 | Gieseke et al. |
| 6,872,237 B2 | 3/2005 | Gillingham et al. |
| 6,878,190 B1 | 4/2005 | Xu et al. |
| 6,908,494 B2 | 6/2005 | Gillingham et al. |
| 6,936,084 B2 | 8/2005 | Schlensker et al. |
| 6,966,940 B2 | 11/2005 | Krisko et al. |
| D513,314 S | 12/2005 | Iddings et al. |
| 6,986,805 B2 | 1/2006 | Gieseke et al. |
| 7,001,450 B2 | 2/2006 | Gieseke et al. |
| 7,004,986 B2 | 2/2006 | Kopec et al. |
| 7,070,642 B2 | 7/2006 | Scott et al. |
| 7,115,156 B2 | 10/2006 | Schaerlund |
| 7,211,124 B2 | 5/2007 | Gieseke et al. |
| 7,252,704 B2 | 8/2007 | Tokar et al. |
| 7,267,706 B2 | 9/2007 | Schaerlund |
| 7,291,198 B2 | 11/2007 | Gieseke et al. |
| 7,311,748 B2 | 12/2007 | Holmes |
| 7,326,342 B2 | 2/2008 | Richmond et al. |
| 7,329,326 B2 | 2/2008 | Wagner et al. |
| 7,332,009 B2 | 2/2008 | Casey et al. |
| 7,351,270 B2 | 4/2008 | Engelland et al. |
| 7,413,588 B2 | 8/2008 | Holzmann et al. |
| 7,455,707 B2 | 11/2008 | Engel et al. |
| 7,520,913 B2 | 4/2009 | Mills et al. |
| 7,524,349 B2 | 4/2009 | Schrage et al. |
| 7,537,631 B2 | 5/2009 | Scott et al. |
| 7,550,023 B2 | 6/2009 | Schuster et al. |
| 7,563,300 B2 | 7/2009 | Nishiyama et al. |
| 7,572,310 B2 | 8/2009 | Gieseke |
| 7,641,708 B2 | 1/2010 | Kosmider et al. |
| 7,655,074 B2 | 2/2010 | Nepsund et al. |
| 7,662,203 B2 | 2/2010 | Scott et al. |
| 7,682,416 B2 | 3/2010 | Engelland et al. |
| 7,713,321 B2 | 5/2010 | Kuempel et al. |
| 7,736,410 B2 | 6/2010 | Kuempel et al. |
| RE41,713 E | 9/2010 | Gunderson et al. |
| 7,828,203 B2 | 11/2010 | Rech et al. |
| 7,828,870 B1 | 11/2010 | Rech |
| RE42,174 E | 3/2011 | Gunderson et al. |
| 7,972,404 B2 | 7/2011 | Kuempel et al. |
| 7,981,183 B2 | 7/2011 | Nepsund et al. |
| 7,981,186 B2 | 7/2011 | Schrage et al. |
| 7,981,187 B2 | 7/2011 | Gieseke et al. |
| 7,988,757 B2 | 8/2011 | Scott et al. |
| 7,993,422 B2 | 8/2011 | Krisko et al. |
| 8,012,233 B2 | 9/2011 | Kuempel et al. |
| 8,034,145 B2 | 10/2011 | Boehrs et al. |
| 8,038,756 B2 | 10/2011 | Iddings et al. |
| 8,066,791 B2 | 11/2011 | Baseotto et al. |
| 8,128,724 B2 | 3/2012 | Mills et al. |
| 8,142,533 B2 | 3/2012 | Gillenberg et al. |
| 8,147,576 B2 | 4/2012 | Gillenberg et al. |
| 8,147,582 B2 | 4/2012 | Engelland et al. |
| 8,152,876 B2 | 4/2012 | Gillenberg et al. |
| 8,163,056 B2 | 4/2012 | Coulonvaux et al. |
| 8,182,569 B2 | 5/2012 | Casey et al. |
| 8,202,419 B2 | 6/2012 | Wallerstorfer et al. |
| 8,216,334 B2 | 7/2012 | Nelson et al. |
| 8,216,335 B2 | 7/2012 | Scott et al. |

(56) References Cited

U.S. PATENT DOCUMENTS

| | | |
|---|---|---|
| 8,241,384 B2 | 8/2012 | Schrage et al. |
| 8,273,143 B2 | 9/2012 | Coulonvaux et al. |
| 8,277,532 B2 | 10/2012 | Reichter et al. |
| 8,287,612 B2 | 10/2012 | Gillenberg |
| 8,292,983 B2 | 10/2012 | Reichter et al. |
| 8,292,984 B2 | 10/2012 | Baseotto et al. |
| 8,382,875 B2 | 2/2013 | Engelland et al. |
| 8,382,876 B2 | 2/2013 | Widerski et al. |
| 8,394,166 B2 | 3/2013 | Scott et al. |
| 8,409,316 B2 | 4/2013 | Nelson et al. |
| 8,414,675 B2 | 4/2013 | Iddings et al. |
| 8,460,425 B2 | 6/2013 | Scott et al. |
| 8,460,452 B2 | 6/2013 | Scott et al. |
| 8,480,778 B2 | 7/2013 | Baseotto et al. |
| 8,518,141 B2 | 8/2013 | Schrage et al. |
| 8,545,588 B2 | 10/2013 | Iddings et al. |
| 8,562,707 B2 | 10/2013 | Nepsund et al. |
| 8,574,333 B2 | 11/2013 | Nelson |
| 8,636,820 B2 | 1/2014 | Reichter et al. |
| 8,641,795 B2 | 2/2014 | Coulonvaux et al. |
| 8,702,831 B2 | 4/2014 | Scott et al. |
| 8,747,512 B2 | 6/2014 | Mills et al. |
| 8,758,470 B2 | 6/2014 | Blossey et al. |
| 8,784,523 B2 | 7/2014 | Coulonvaux et al. |
| 8,814,973 B2 | 8/2014 | Baseotto et al. |
| 8,852,309 B2 | 10/2014 | Scott et al. |
| 8,864,866 B2 | 10/2014 | Osendorf et al. |
| 8,916,044 B2 | 12/2014 | Rapin |
| 9,039,802 B2 | 5/2015 | Scott et al. |
| 9,067,161 B2 | 6/2015 | Campbell |
| 9,162,174 B2 | 10/2015 | Baseotto et al. |
| 9,221,004 B2 | 12/2015 | Iddings et al. |
| 9,238,189 B2 | 1/2016 | Baseotto et al. |
| 9,353,657 B2 | 5/2016 | Scott et al. |
| 9,387,428 B2 | 7/2016 | Osendorf et al. |
| 9,586,166 B2 | 3/2017 | Coulonvaux et al. |
| 9,610,529 B2 | 4/2017 | Mills et al. |
| 9,636,615 B2 | 5/2017 | Osendorf et al. |
| 9,718,019 B2 | 8/2017 | Baseotto et al. |
| 9,889,398 B2 | 2/2018 | Campbell et al. |
| 9,925,485 B2 | 3/2018 | Campbell et al. |
| 10,029,199 B2 | 7/2018 | Scott et al. |
| 10,124,285 B2 | 11/2018 | Baseotto et al. |
| 10,245,544 B2 | 4/2019 | Iddings et al. |
| 10,258,913 B2 | 4/2019 | Osendorf et al. |
| 10,279,302 B2 | 5/2019 | Mills et al. |
| 10,307,704 B2 | 6/2019 | Scott et al. |
| 10,576,403 B2 | 3/2020 | Osendorf et al. |
| 10,625,191 B2 | 4/2020 | Campbell et al. |
| 10,653,991 B2 | 5/2020 | Mills et al. |
| 10,710,017 B2 | 7/2020 | Baseotto et al. |
| 10,751,661 B2 | 8/2020 | Iddings et al. |
| 10,786,772 B2 | 9/2020 | Baseotto et al. |
| 2002/0014058 A1 | 2/2002 | Engel et al. |
| 2002/0040569 A1 | 4/2002 | Reinhold |
| 2002/0112458 A1 | 8/2002 | Schneider et al. |
| 2002/0170279 A1 | 10/2002 | Gustafason et al. |
| 2002/0184864 A1 | 12/2002 | Bishop et al. |
| 2003/0051455 A1 | 3/2003 | Gieseke et al. |
| 2003/0121242 A1 | 7/2003 | Amann et al. |
| 2003/0146149 A1 | 8/2003 | Binder et al. |
| 2004/0020177 A1 | 2/2004 | Ota et al. |
| 2004/0025485 A1 | 2/2004 | Lee |
| 2004/0134171 A1 | 7/2004 | Scott et al. |
| 2004/0261383 A1 | 12/2004 | Schaerlund et al. |
| 2006/0086075 A1 | 4/2006 | Scott et al. |
| 2006/0112668 A1 | 6/2006 | Gieseke et al. |
| 2007/0163945 A1 | 7/2007 | Banzhaf et al. |
| 2007/0170103 A1 | 7/2007 | Fick |
| 2008/0041026 A1 | 2/2008 | Engel |
| 2008/0190082 A1 | 8/2008 | Scott et al. |
| 2008/0257161 A1 | 10/2008 | Read |
| 2008/0307759 A1 | 12/2008 | Reichter et al. |
| 2009/0049814 A1 | 2/2009 | Baseotto et al. |
| 2009/0094951 A1* | 4/2009 | Baseotto ............ B01D 46/2414 55/498 |
| 2009/0100813 A1 | 4/2009 | Iddings et al. |
| 2009/0101567 A1 | 4/2009 | Benson et al. |
| 2009/0145095 A1 | 6/2009 | Juliar et al. |
| 2009/0188856 A1 | 6/2009 | Benson et al. |
| 2009/0217632 A1 | 9/2009 | Coulonvaux et al. |
| 2010/0064646 A1 | 3/2010 | Smith |
| 2010/0126131 A1 | 5/2010 | Scott et al. |
| 2010/0146917 A1 | 6/2010 | Coulonvaux et al. |
| 2010/0146919 A1 | 6/2010 | Nelson et al. |
| 2010/0146920 A1 | 6/2010 | Iddings et al. |
| 2010/0147381 A1 | 6/2010 | Haney et al. |
| 2010/0243554 A1 | 9/2010 | Herrin et al. |
| 2011/0017657 A1 | 1/2011 | Jokschas et al. |
| 2011/0094197 A1 | 4/2011 | Ruhland et al. |
| 2011/0173937 A1 | 7/2011 | Nelson |
| 2011/0247582 A1 | 10/2011 | Blossey et al. |
| 2011/0308212 A1 | 12/2011 | Ruhland et al. |
| 2012/0055127 A1 | 3/2012 | Holzmann et al. |
| 2013/0199138 A1 | 8/2013 | Scott et al. |
| 2014/0059986 A1 | 3/2014 | Kaufmann et al. |
| 2014/0102058 A1 | 4/2014 | Kaufmann et al. |
| 2014/0144112 A1 | 5/2014 | Campbell |
| 2014/0298763 A1 | 10/2014 | Blossey et al. |
| 2017/0361249 A1 | 12/2017 | Ries |
| 2019/0060815 A1 | 2/2019 | Movia |
| 2020/0353397 A1 | 11/2020 | Campbell et al. |

FOREIGN PATENT DOCUMENTS

| | | |
|---|---|---|
| DE | 29501276 | 1/1995 |
| DE | 19519438 | 11/1996 |
| DE | 19547575 A1 | 6/1997 |
| DE | 19849089 A1 | 4/2000 |
| DE | 19849998 | 5/2000 |
| DE | 19935297 | 2/2001 |
| DE | 10020538 | 10/2001 |
| DE | 102004005210 | 8/2005 |
| DE | 102011106502 | 1/2011 |
| EP | 0 230 991 A2 | 8/1987 |
| EP | 0 329 659 B1 | 8/1989 |
| EP | 0 480 991 B1 | 4/1992 |
| EP | 0 562 502 | 9/1993 |
| EP | 1 070 841 | 7/2000 |
| EP | 1 023 933 | 8/2000 |
| EP | 1 216 743 | 8/2000 |
| EP | 1 106 232 | 6/2001 |
| EP | 1 128 891 | 9/2001 |
| EP | 1 144 078 | 10/2001 |
| EP | 1 123 460 B1 | 8/2003 |
| EP | 1 174 171 B1 | 8/2004 |
| EP | 1 357 997 B1 | 9/2006 |
| EP | 1 754 525 A1 | 2/2007 |
| FR | 1 569 913 | 6/1969 |
| FR | 2 665 217 | 1/1992 |
| GB | 1 125 335 | 4/1919 |
| GB | 1 124 735 | 8/1968 |
| GB | 1 245 419 | 9/1971 |
| GB | 1 499 922 | 2/1978 |
| GB | 1 511 904 | 5/1978 |
| GB | 1 567 645 | 5/1980 |
| GB | 1567645 A | 5/1980 |
| GB | 2 110 110 | 6/1983 |
| GB | 2 119 674 | 11/1983 |
| GB | 2 163 368 | 2/1986 |
| JP | H08252417 | 10/1996 |
| JP | 2004136203 | 5/2004 |
| JP | 2016-002522 A | 1/2016 |
| SU | 868082 | 9/1981 |
| WO | 89/01818 | 3/1989 |
| WO | 91/00425 | 1/1991 |
| WO | 96/12550 | 5/1996 |
| WO | 98/11977 | 3/1998 |
| WO | 99/42719 | 8/1999 |
| WO | 2000/23166 | 4/2000 |
| WO | 2000/25894 | 5/2000 |
| WO | 2001/091884 | 12/2001 |
| WO | 2002/45819 | 6/2002 |

(56) References Cited

FOREIGN PATENT DOCUMENTS

| WO | 2002/078816 A1 | 10/2002 |
| WO | 2004/009215 | 1/2004 |
| WO | 2004/039476 | 5/2004 |
| WO | 2005/092475 | 10/2005 |
| WO | 2006/026241 | 3/2006 |
| WO | 2006/119414 A1 | 11/2006 |
| WO | 2007/009040 | 1/2007 |
| WO | 2008/045326 A2 | 4/2008 |
| WO | 2008/124437 | 10/2008 |
| WO | 2009/014982 | 1/2009 |
| WO | 2009/014982 A1 | 1/2009 |
| WO | 2009/014986 | 1/2009 |
| WO | 2009/014988 | 1/2009 |
| WO | 2009/047196 | 4/2009 |
| WO | 2010/057843 | 5/2010 |
| WO | 2010/091917 | 8/2010 |
| WO | 2011/110952 | 9/2011 |
| WO | 2012/116314 | 8/2012 |

OTHER PUBLICATIONS

International Written Opinion for International Application No. PCT/US2018/031656 dated Jul. 17, 2018 (9 pages).
U.S. Appl. No. 14/518,102 filed Oct. 20, 2014.
Office Action for Chinese Patent Application No. 201880029797.4 dated Oct. 26, 2021.
Office Action for Russian Application No. 2019135625 dated Sep. 16, 2021.

* cited by examiner

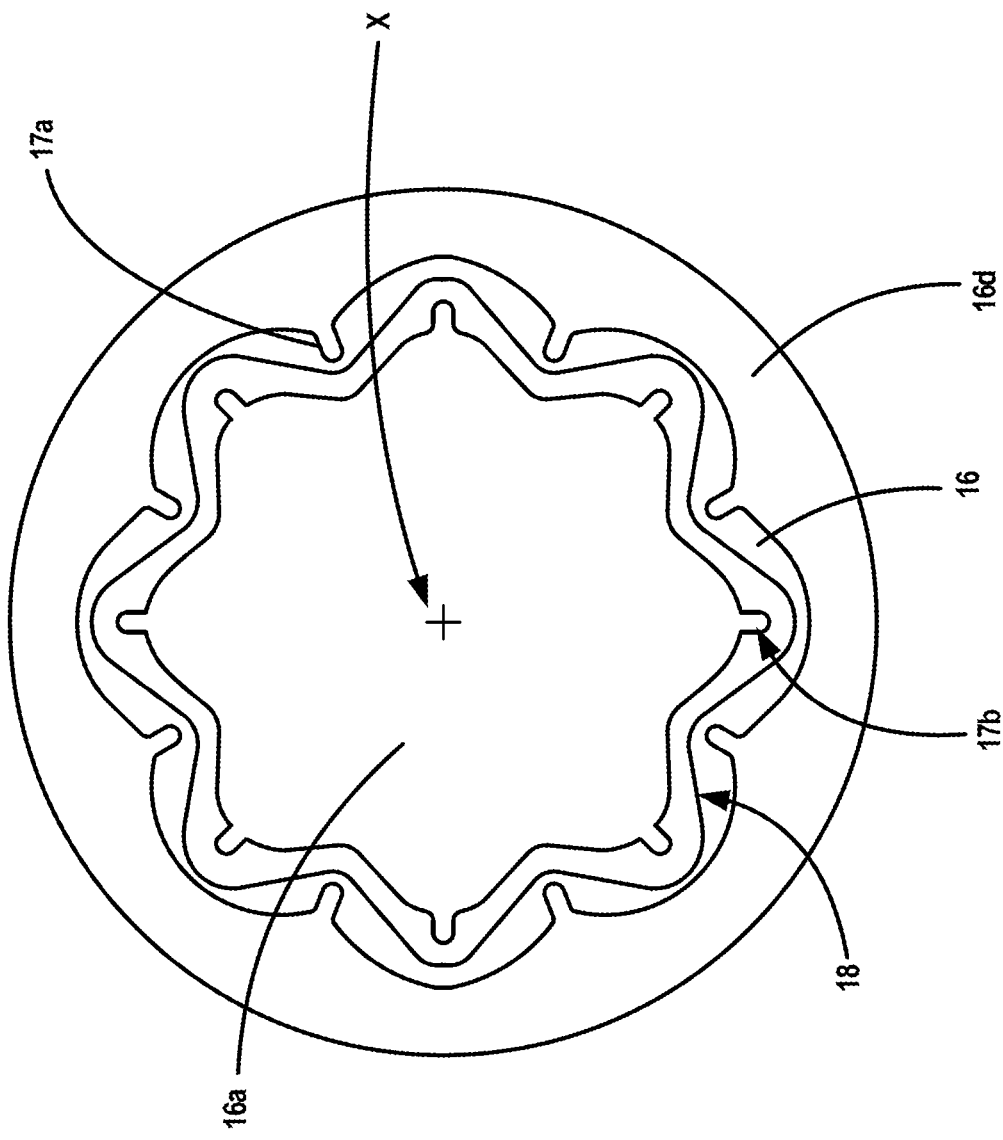

ADAPTER AND AIR FILTER CARTRIDGE BEING ADAPTED FOR USE WITH SUCH AN ADAPTER

CROSS REFERENCE TO RELATED APPLICATIONS

This application is a National Stage of PCT International patent application No. PCT/US2018/031656 filed 8 May 2018 which claims benefit of EP Patent Application No. 17170112.1, filed 9 May 2017, and which applications are incorporated herein by reference. To the extent appropriate, a claim of priority is made to each of the above disclosed applications.

FIELD OF THE DISCLOSURE

The present invention relates to an adapter for use in a dedicated coupling system for releasably coupling an air filter cartridge and a housing of a dedicated air filter assembly. The present invention also relates to an air filter cartridge being adapted for use with such an adapter. The present invention also relates to a coupling system for releasably coupling an air filter cartridge and a housing of a dedicated air filter assembly. The present invention also relates to an air filter assembly with a housing and with an air filter cartridge.

BACKGROUND

Air filter cartridges and dedicated air filter assemblies with respective housings for receiving such air filter cartridges are well known in the prior art. Such air filter assemblies are generally known to be used for filtering dirty air to provide clean air. Such clean air can then be used as avionic air, air plane cabin air, industrial air, intake air for gas turbines or combustion engines of a variety of planes, vehicles and other equipment such as: air planes; trucks; buses; off-road construction equipment; agricultural equipment; generator sets; etc. After some duration of use the air filter cartridge in such an air filter assembly needs to be serviced. The air filter cartridge can be typically serviced by replacing it with a new air filter cartridge.

An example of a known air filter cartridge with a dedicated air filter assembly is disclosed in the international publication WO 2009/014982 A1. This prior art shows for example an air filter cartridge comprising: a media pack surrounding an open interior and having first and second, opposite, ends; a first end cap positioned on the first end of the media pack; the first end cap having a central air flow aperture there through; a housing seal on the first end cap; and, a second end cap positioned on the second end of the media pack; the second end cap being a closed end cap; and, the second end cap including a central projection arrangement thereon projecting in a direction away from the first end cap; the projection arrangement being non-circular and including at least one arcuate section; the at least one arcuate section defining a curvature that does not correspond to a segment of a circle surrounding a center of the projection, wherein the projection arrangement comprises a closed, solid, continuous serpentine wall.

SUMMARY

An object of the present invention is to improve known air filter cartridges and dedicated air filter assemblies. It is in particular an object of the present invention to provide an improved air filter cartridge and a dedicated air filter assembly with an improved ability to inhibit, at least reduce the likelihood of, at least make more recognizable, an installation or use of an unapproved or incorrect air filter cartridge in a dedicated air filter assembly.

The aforementioned object is achieved by the subject-matter of the independent claims.

In this disclosure, if an object is defined as being "rotatably coupleable" with another object, it means that the object can be coupled with the other object, but, when being coupled, at least one of the objects can still rotate, preferably about a coupling axis of the coupling, with respect to the other object.

In this disclosure, if an object is defined as being "non-rotatably coupleable" with another object, it means that the object can be coupled with the other object, but, when being coupled, the objects cannot rotate any more, in particular about a coupling axis of the coupling, with respect to each other.

In an aspect of the present disclosure, the known air filter cartridges can be improved. By adapting the air filter cartridge for use with an adapter, it is advantageously possible to achieve at least one of the afore-mentioned objects of the present disclosure. It is in particular possible by adapting the air filter cartridge for use with an adapter to provide an improved ability to inhibit, at least reduce the likelihood of, at least make more recognizable, an installation or use of an incorrect air filter cartridge in a dedicated air filter assembly. In this respect the adapter can also be regarded as serving as an interface between the air filter cartridge and the housing. That means that it is possible to indicate if an air filter cartridge is the correct one or not, because generally an air filter cartridge carrying the correct cartridge-side coupling element will fit into the second surface area and filter housing to create a non-rotatable coupling between cartridge and adapter.

By providing an adapter between the air filter cartridge and a housing of a dedicated air filter assembly it is advantageously possible to adapt the air filter cartridge to a certain adapter, in particular to adapt an end cap showing a cartridge-side coupling element to a respective non-rotatably coupleable second surface area of the adapter, so that at least one of the afore-mentioned objects is achieved. In particular the object can be achieved that an installation of an incorrect air filter cartridge is inhibited, made more difficult, or at least made more readily recognizable compared to the prior art solutions. It can be an advantage that, by changing the adapter and filter element endcap features appropriately, it can be avoided that for instance older, for instance insufficiently performing filter elements, having an incompatible coupling feature, would be installed. Thereby the filter housing does not need to be replaced.

If for example a filter media in the air filter cartridge shall be changed in its filter characteristic, while the outer dimensions of the cartridge are unchanged, and such cartridge shall be identified by a specified design of the cartridge-side coupling element, e.g. on the end cap, of the cartridge, one can simply provide a specific shape of the second surface area on the adapter, which surface is non-rotatably coupleable with the cartridge-side coupling element present on the end cap of the filter cartridge, to make sure that the air filter cartridge with the changed filter characteristic is placed into such air filter as-assembly comprising such an adapter.

By using an adapter for use in a dedicated coupling system for releasably coupling an air filter cartridge and a housing of a dedicated air filter assembly, the adapter having a first surface area being rotatably coupleable with a housing-side coupling element of the coupling system, and a second surface area being non-rotatably coupleable with a cartridge-side coupling element of the coupling system, it is possible for the adapter to rotate with respect to the housing-side coupling element and therefore with respect to the housing in the installed position. This advantageously makes installation much easier since the air filter cartridge does not need to have a certain pre-defined position in the housing when being installed.

In a preferred embodiment of the adapter the second surface area comprises a adapter-side three-dimensional structure being non-rotationally coupleable with an at least partially, preferably completely, complementary cartridge-side three-dimensional structure of a surface area of the cartridge-side coupling element. By such three-dimensional structures it is easily possible to manufacture the adapter in an at least partially, preferably com-politely, complementary three-dimensional structure with respect to the three-dimensional structure of the cartridge-side coupling element, e.g. by pressing/molding such structures with respective molds.

It will be appreciated that the structures on the second surface area of the adapter and of the cartridge-side coupling element must not be completely complementary to provide the desired non-rotatable coupling. It is sufficient to have the desired non-rotatable coupling if the three-dimensional structures fit to each other partly. This can for example already be reached if the three-dimensional structure of the cartridge-side coupling element has 6 pin-like projections positioned on a circle but the three-dimensional structure on the second surface area has 8 correspondingly sized recesses or holes positioned on a circle with the same diameter as the circle defined by the pin-like projections, so that 6 of the 8 recesses or holes can receive the 6 pin-like projections to provide the desired non-rotatable coupling.

The adapter-side three-dimensional structure is preferably non-rotationally coupleable with the cartridge-side three-dimensional structure of a surface area of the cartridge-side coupling element. The cartridge-side three-dimensional structure can be a projection or projection arrangement, and the adapter-side three-dimensional structure can be a recess or groove, or vice versa.

The projection can project from a remainder of an, preferably closed, end cap of an air filter cartridge, in a direction away from the end cap; for example, if the cartridge is substantially cylindrical, in a general direction away from an opposite, preferably open, end cap.

The general direction of projection is preferably generally axial, for example, substantially in the direction corresponding to the general direction of a central axis of the cartridge if the cartridge is substantially cylindrical, and away from an opposite, preferably open, end cap. By "axial" in this context, it is not meant that the projection is necessarily precisely parallel to a central axis of the cartridge, if the cartridge is cylindrical. Indeed, it is also possible that the projection is angled from central axis of cartridge somewhat.

The projection can have an outer surface which can slant inwardly, along a direction of extension from an adjacent region of an end cap; and an inner surface which can slant outwardly along its direction of extension from an adjacent region of an end cap.

Angles to outer and inner surfaces of projection of the type indicated above, can provide the projection with an axially outermost tip, which can be narrowed somewhat relative to a base region of the projection. A somewhat narrow tip facilitates insertion into a corresponding groove formed on an adapter, described above.

In particular, and preferably separate from the above, it is preferred that such a tip comprises a rounded surface to facilitate insertion into the corresponding groove of adapter, or vice versa. With other words: such tip can comprise a, preferably rounded, surface to facilitate a non-rotational coupling between the cartridge-side three-dimensional structure or projection of the coupling system and the adapter-side three-dimensional structure or groove on the adapter of the coupling system, or vice versa.

In particular, and preferably separate from the above, it is preferred that such a tip comprises a rounded surface, to provide an auto-alignment when an insertion of projection into the groove of adapter is performed. With other words: such a tip can comprise a rounded surface to provide an auto-alignment when a non-rotational coupling between the cartridge-side three-dimensional structure or projection and the adapter-side three-dimensional structure or groove on the adapter of the coupling system is performed, or vice versa.

Although alternatives are possible, the projection preferably comprises a, preferably continuous, wall. By "continuous" in this context, it is preferably meant that there are no gaps in the wall with respect to extension around the perimeter defined by such a wall, for example around a center of the projection.

Also, although alternatives are possible, such wall is preferably closed, more preferably completely "closed". By "closed" it is meant that the wall preferably includes no apertures therethrough, in its continuous extension.

In cross-section, it is also noted that such a projection is preferably "solid" throughout; i.e. preferably does not have a hollow interior between outer and inner surfaces, although alternatives are possible.

The projection arrangement preferably has a minimum largest external dimension thereacross. An advantage of this is that it can facilitate engagement with the adapter.

The projection preferably has a serpentine outer surface and preferably has a serpentine inner surface. By "serpentine" in connection with the outer surface, it is preferably meant that in extension around a center of the projection, the outer surface does not define a series of straight lines or even a circle, but rather a series of alternating inner and outer curves.

For the example the serpentine outer surface preferably comprises a plurality of radially outwardly facing convex sections, and a plurality of radially outwardly facing concave sections, preferably alternating with one another.

Referring to outer surface, the reference to a "radially outwardly facing convex section" is preferably meant to refer to a section of surface which curves outwardly; and the reference to "radially outwardly facing concave sections" is preferably meant to refer to a section of surface which curves inwardly.

Analogously, radially inwardly facing inner surface is preferably also serpentine, preferably comprising a plurality of radially inwardly facing convex sections and radially inwardly facing concave sections, preferably alternating with respect to one another, as the inner surface extends around center of the projection.

Preferably, each concave section of inner surface corresponds with, and more preferably aligns radially with, a convex section of outer surface; and, preferably each convex section of inner surface corresponds with, and more preferably aligns radially with, concave section of outer surface.

Projection preferably defines, in each of the outer surface and inner surface, n concave sections and n convex sections, n being preferably 2, 4, 6, 8, 10, or 12. Further: (a) preferably a curvature of each convex section of the outer surface is the same as each convex section in inner surface, and, (b) preferably a curvature of each concave section of the outer surface is the same as each concave section in inner surface. The result is a regular "petal" shape to projection.

By the term "petal" in this context, it is preferably meant that when viewed in plan view, the projection can be seen to have a plurality of outwardly projecting petals, i.e., curved sections. By the term "regular" in this context, it is preferably meant that each outwardly projecting petal has the same shape as each other outwardly projecting petal.

Projection preferably comprises a plurality of outward, preferably convex petal, sections and inward, preferably concave, sections, preferably providing for a serpentine extension of projection around a center of the projection.

Preferably the curvature of each outwardly directed convex section is such as to have a smaller radius of curvature than a hypothetical curvature of such a section if directed on, or positioned on, a circle centered on a center of the projection.

In a preferred embodiment, the width of the groove is shaped in such a way that it is not possible to insert a ring structure into the groove. With other words: In such a preferred embodiment, the groove has such curves or a curved or preferably serpentine structure that it is impossible to insert a projection being a ring-like and circular projection. In such a preferred groove only substantially corresponding curved, zig-zag shaped or serpentine structures can be inserted.

In a preferred embodiment of the adapter, for which embodiment is also claimed independent protection, the adapter-side three-dimensional structure is ending at an outer rim of the adapter which outer rim is non-circular, preferably oval, and/or elliptical and/or asymmetrical. For example, one part of the outer rim can have a smaller radius compared with one or more other parts of the outer rim. In a preferred embodiment, the outer rim has a smaller outer diameter than the inner rim of the end cap surrounding the projection on the end cap. Then the projection needs to be placed at a predetermined position with respect to this asymmetry of the adapter, for good alignment and fit/coupling. If there is no good alignment, there is no auto-fit/coupling. The use of e.g. a cylinder-type protrusion on the end cap would not be able to provide good or auto-alignment and thus no auto-fit.

In another preferred embodiment, the outer rim has a larger outer diameter than the inner rim of the end cap surrounding the projection on the end cap. In a preferred embodiment of the inventive adapter the adapter-side three-dimensional structure is ending at an outer rim of the adapter which outer rim is only slightly non-circular. In this respect the term "slightly" means just being about 1-5% above a respective production tolerance of the outer rim periphery. More preferably, this outer rim is completely circular.

In a preferred embodiment of the inventive adapter the second surface area comprises an at least n-fold rotational symmetric three-dimensional structure, $n \geq 1$, preferably $n > 1$, more preferably $n \geq 8$, being non-rotationally coupleable with an at least partially, preferably completely, complementary cartridge-side three-dimensional structure of the cartridge-side coupling element. Any values of $n \geq 1$ provide the advantages of the present invention.

By an n-fold rotational symmetric three-dimensional structure, with n=1, the simplest possible way of implementing the invention is provided, e.g. by simply having one pin-like projection as the cartridge-side coupling element positioned off-center of a central axis of the cartridge carrying the cartridge-side coupling element, and by having a correspondingly sized recess or hole positioned on the second surface area of the adapter with the same radius off-center of a central axis of the adapter. Also one radially extending nose on a ring-like structure could be used as such a structure.

By an at least n-fold rotational symmetric three-dimensional structure, with $n > 1$, there are at least n rotational positions of the cartridge in space which can be used by the installer to couple the cartridge with the adapter and therefore with the housing. This makes installation faster. It has been found that with n being between 4 and 12, preferably n=8, there is a good compromise between providing as many possible rotational positions and ease of production of the structures.

In a preferred embodiment of the inventive adapter the second surface area comprises at least one recess and/or at least one projection being non-rotationally coupleable with at least one at least partially, preferably completely, complementary projection and/or recess of a surface area of the cartridge-side coupling element. As already described above in connection with the examples of holes and pins, such a combination of at least one projection and at least one receiver, or vice versa, is easy to implement.

In a preferred embodiment of the inventive adapter the second surface area comprises at least one, preferably curved and/or serpentine-like and/or zig-zag shaped and/or continuous, groove, and/or at least one, preferably curved and/or serpentine-like and/or zig-zag shaped and/or continuous, projection being non-rotatably coupleable with at least one at least partially, preferably completely, complementary projection and/or recess of a surface area of the cartridge-side coupling element. Such a groove/projection structure is easy to implement and therefore easy to produce. The serpentine-like and in particular the serpentine-like and continuous shape provides a simultaneously reliable and low-wear embodiment of the present invention.

In a preferred embodiment groove and/or projection on the second surface area are centrosymmetric about a central axis of the second surface, and projection and/or recess of a surface area of the cartridge-side coupling element are centrosymmetric about a central axis of the cartridge-side coupling element. Such a centrosymmetric structure is easy to implement and therefore easy to produce.

In a preferred embodiment of the inventive adapter the first surface area comprises a, preferably pin-like, projection or a, preferably pin-hole-like, receiver for being rotatably coupleable with a, preferably pin-hole-like, receiver or a, preferably pin-like, projection on the housing-side coupling element. Such a structure is easy to implement and therefore easy to produce.

In a preferred embodiment of the inventive coupling system the cartridge-side coupling element being mounted on, preferably being integral with, more preferably being, an, preferably closed, end cap of the air filter cartridge. By having the coupling element mounted on, preferably being integral with, more preferably being, an, preferably closed, end cap of the air filter cartridge, it is provided the technical effect that the cartridge-side coupling element is simply provided on the cartridge itself so that the cartridge-side coupling element is part of the cartridge so that the cartridge itself carries the key which identifies the cartridge as being the suitable cartridge for the matching adapter surface.

In a preferred embodiment of the inventive coupling system, the housing-side coupling element is releasably mounted in the housing. Hereby it is provided the technical effect that not only the adapter can be changed but the adapter can be changed together with the housing-side coupling element for ease of service of the adapter, or even only the housing-side coupling element can be changed if the adapter is still alright but the housing-side coupling element is not or shall be changed separately for other reasons.

In a preferred embodiment of the inventive coupling system the housing-side coupling element comprises at least one flexible and/or spring-like wire, on which a receiver or a projection is mounted for being rotatably coupleable with a projection or with a receiver on the first surface area of the adapter, and which wire is flexible in a coupling direction of a coupling of the first surface area with the housing-side coupling element and/or of a coupling of the second surface area with the cartridge-side coupling element. Such at least one flexible wire an easy way to provide an element which is flexible in a coupling direction of a coupling of the first surface area with the housing-side coupling element and/or of a coupling of the second surface area with the cartridge-side coupling element, to enable an easy coupling of the cartridge with the adapter.

In a preferred embodiment of the inventive coupling system the housing-side coupling element comprises two wires which are crossing each other substantially in their mid-points. By at least two wires the stability of the housing-side coupling element is enhanced.

In a preferred embodiment of the inventive coupling system the wires carry the receiver or the projection in an area where the wires are crossing each other. By carrying the receiver or the projection in an area where the wires are crossing each other, the housing-side coupling element carries the receiver or the projection within its most stable and robust area.

In a preferred embodiment of the inventive air filter assembly the housing comprises a first fixation element and a second fixation element, so that the housing-side coupling element can be, preferably releasably, fixed in the housing between the first fixation element and the second fixation element. By this measure the housing-side coupling element can be easily mounted in the housing. In particular, if the housing-side coupling element releasably is fixed in the housing between the first fixation element and the second fixation element, it has the technical effect that housing-side coupling element can be serviced independently.

An air filter cartridge of the present invention, for which air filter cartridge is claimed independent protection, is preferably being adapted for use with an adapter of the present invention, comprises a filter media pack extending between a first end and a second, opposite, end, a, preferably closed, first end cap on the first end of the filter media pack, and a cartridge-side coupling element of a coupling system for releasably coupling the air filter cartridge and a housing of a dedicated air filter assembly, prefera-bly according to the present invention, wherein the cartridge-side coupling element being mounted on, preferably being integral with, more preferably being, the first end cap.

In a preferred embodiment of the air filter cartridge of the present invention, the air filter cartridge further comprises a second end cap on the second end of the filter media pack, wherein the cartridge-side coupling element comprises a surface area facing away from the second end cap, the surface area having a three-dimensional structure, and wherein a shortest distance between the surface area and the second end of the media pack is, preferably between about 1, about 3, about 5 or about 10% and about 20, about 25 or about 30%, shorter than the axial length of the filter media pack from its first end to its second end. By this inventive measure the mass of the air filter cartridge is less spread out over the length of the air filter cartridge but more centered. Therefore the inventive air filter cartridge is easier to handle and the coupling between the inventive adapter and the cartridge is stronger since the second end cap and its contact with the dedicated housing of the dedicated air filter assembly is closer to the coupling interface, i.e., the contact between the second surface area of the adapter and the three-dimensionally structured surface area of cartridge-side coupling element. The adapter is preferably partly positioned inside the first end cap. Also, by the afore-mentioned positioning of the lowest part of the three-dimensionally structured surface area inside an interior surrounded by the filter media pack, the total overall outer length of such inventive air filter cartridge is reduced which makes it possible to make the filter media pack longer compared to known air filter cartridges where the shortest distance between the surface area of a coupling element and the second end of the media pack is equal or even longer than the length of the filter media pack from the first end to the second end.

In a preferred embodiment of the air filter cartridge of the present invention a longest distance between the surface area and the second end of the media pack is, preferably between about 1, about 3, about 5 or about 10% and about 20, about 25 or about 30%, longer than the axial length of the filter media pack from its first end to its second end. This gives the advantage that at least a part of the cartridge-side three-dimensional structure of the cartridge-side coupling element axially is located outside the length of the air filter cartridge if measured between the first end cap and the second end cap so that it is easier to establish the coupling between the cartridge-side coupling element and a dedicated housing of a dedicated air filter assembly.

Further preferred embodiments are contained in the dependent claims.

Preferred embodiments of the present invention are now described with respect to the attached drawings. In the attached drawings identical or similar parts or parts with identical or similar function are identified by the same reference numeral, unless stated differently. In the drawings:

BRIEF DESCRIPTION OF THE DRAWINGS

FIG. 2b is a schematic plan view on another embodiment of a cartridge-side coupling element of the coupling system of the present invention, being adapted to the second surface area of the adapter of FIG. 2a;

FIG. 2c is a schematic plan view on an assembled coupling between the cartridge-side coupling element of FIG. 2b with the second surface area of the adapter of FIG. 2a;

FIG. 2d is a schematic plan view on another embodiment of an assembled coupling between a cartridge-side coupling element with the second surface area of the adapter of FIG. 2a;

FIG. 2e is a schematic plan view on another embodiment of an assembled coupling between a cartridge-side coupling element with the second surface area of the adapter of FIG. 2a;

DETAILED DESCRIPTION

Figure 1:
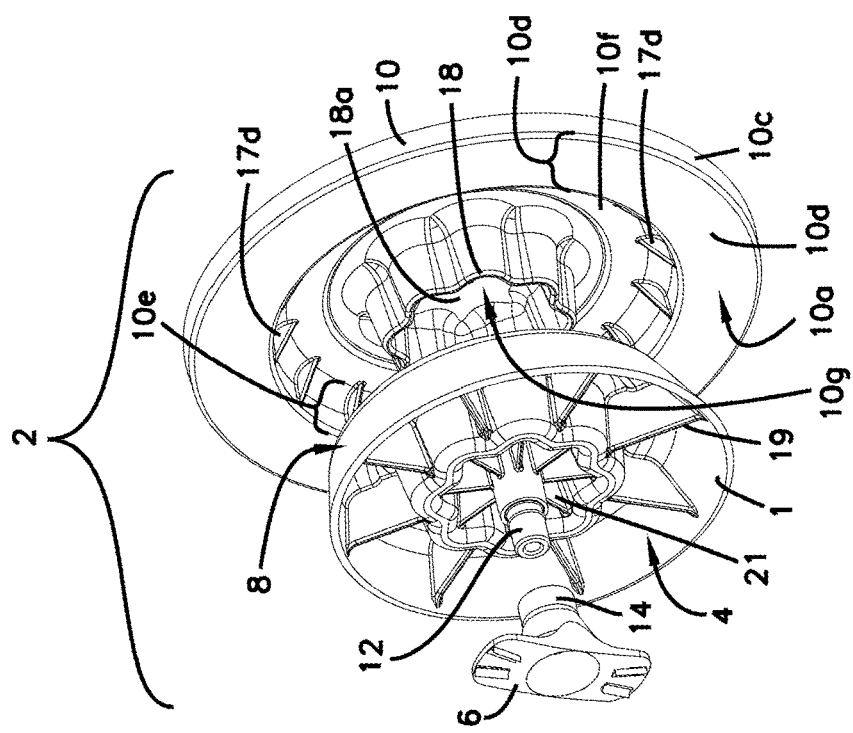
FIG. 1 is an exploded perspective view of a first embodiment of the present invention.

FIG. 1 shows a perspective exploded view on a first embodiment of the present invention. FIG. 1 shows an adapter 1 for use in a dedicated coupling system 2 for releasably coupling an air filter cartridge, for example an air filter cartridge 20 according to FIG. 9, and a housing of a dedicated air filter assembly, for example an air filter assembly 34 and a housing 36 according to FIGS. 15 and 16. Adapter 1 comprises a first surface area 4 facing a housing-side coupling element 6 of the coupling system 2, when in use, and being rotatably coupleable with the housing-side coupling element 6, and a second surface area 8 facing a cartridge-side coupling element 10 of the coupling system 2, when in use, and being non-rotatably coupleable with the cartridge-side coupling element 10. In the first embodiment of FIG. 1 the cartridge-side coupling element 10 is a closed end cap of an air filter cartridge, for example an air filter cartridge 20 as shown in the second embodiment of FIG. 9, described below.

Figure 10:
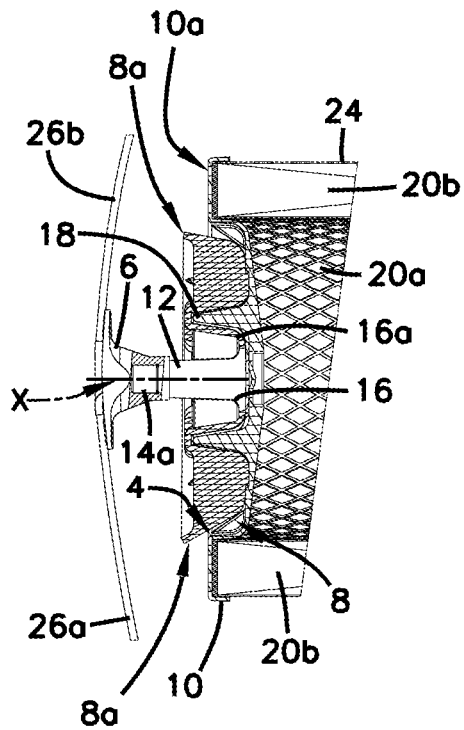
FIG. 10 is a cross-sectional view of a portion of FIG. 9.

The first surface area 4 of adapter 1 is rotatably coupleable with the housing-side coupling element 6, by having a pin-like projection 12 insertable in a respective recess in a projection 14 of the housing-side coupling element 6. Such recess has a substantially complementary width to be able to receive protection 12. Such recess can be shaped as for example the shape of recess 14a a as shown in the embodiment of FIG. 10.

Also not shown, it is also possible that projection 14 as an outer diameter which is smaller than a corresponding recess in projection 12 so that the rotatable coupling between the housing-side coupling element 6 and the first surface area 4 of adapter 1 is provided by having a receiver on the adapter 1 which receives projection 14 for the rotatable coupling connection between the housing-side coupling element 6 and the adapter 1. In both cases adapter 1 can rotate about the housing-side coupling element 6.

In FIG. 1, as indicated above, the cartridge-side coupling element 10 is a closed end cap of an air filter cartridge, for example an air filter cartridge 20 as shown in the second embodiment of FIG. 9, described below. The cartridge-side three-dimensional structure 18 of the surface area 10a of the cartridge-side coupling element 10 is complementary to the recess/groove 16 and is substantially a serpentine-like and continuously shaped projection 18 being substantially complementary shaped to the shape of the recess 16, and a central recess area 18a being complementary to the positive structure or projection 16a on the adapter 1, as can in particular also be seen in FIGS. 10, 12 and 16.

Figure 7:
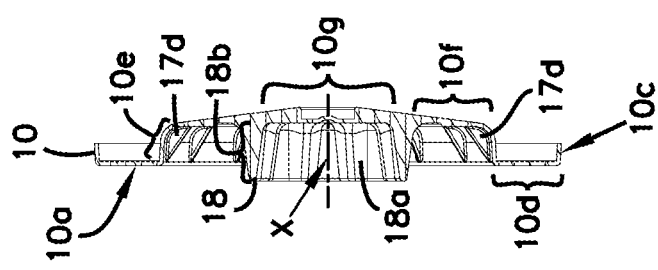
FIG. 7 is a side view on the cartridge-side coupling element of the coupling system of FIG. 1.
Figure 12:
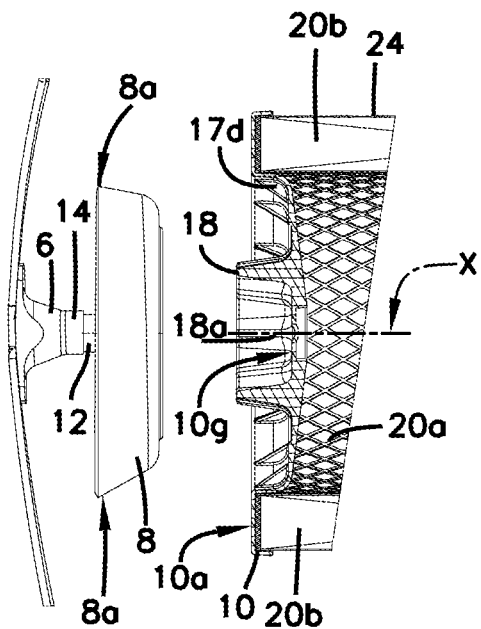
FIG. 12 is an exploded view showing the embodiment of FIG. 9 with the cartridge-side coupling element of the coupling system of FIG. 9 being decoupled from the adapter of FIG. 9.
Figure 16:
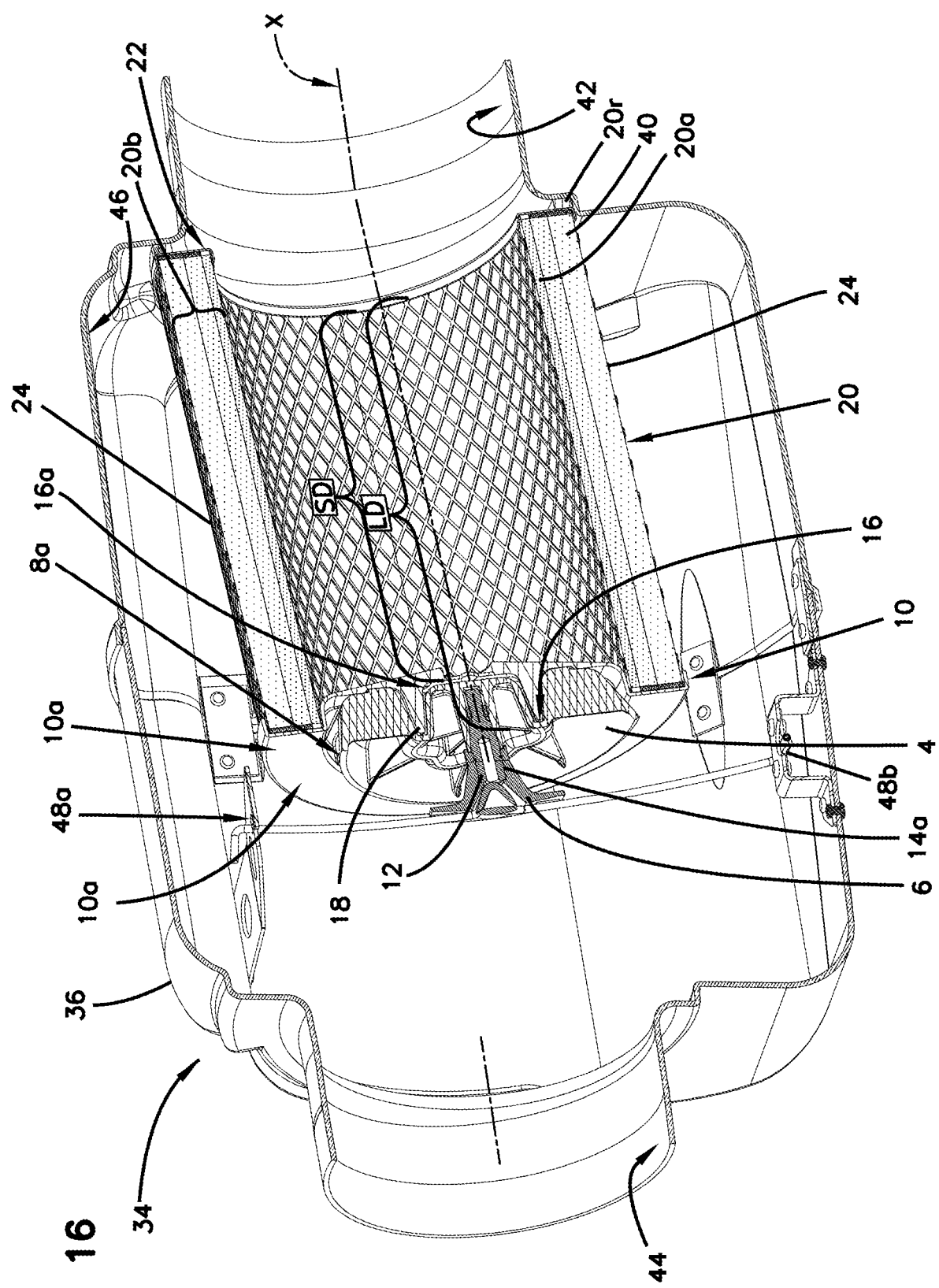
FIG. 16 shows the air filter assembly of FIG. 15 in a cross section.

Element 10 has an outer perimeter 10c provided by a ring-like structure being preferably centrosymmetric with the central axis X of the element 10. When moving from the outer perimeter 10c towards the central axis X, element 10 has a substantially flat ring-like part 10d being connected to part 10c. Part 10d shows a substantially flat surface being substantially normal to the outer surface of outer perimeter 10c. Further moving towards axis X, element 10 has another ring-like structure 10e being connected to part 10d. Structure 10e is substantially normal to part 10d and is substantially parallel to part 10c, and part 10e connects part 10d with a bottom 10f of a ring-like groove-like structure 10f positioned between part 10e and the central ring-like projection 18. When moving further towards axis X, the central recess area 18a being complementary to the positive structure or projection 16a on the adapter 1, as can in particular also be seen in FIGS. 10, 12 and 16, is provided. The central recess area 18a being preferably centrosymmetric to projection 18. As best can be seen in FIG. 7, a depth 18b of the central recess 18a, measured parallel to axis X, is deeper than the depth of the bottom area 10f, defined by the parallel extension of wall or ring 10e if measured parallel to axis X.

An intersection of a plane through bottom 10f occurs preferably at substantially the same point of axis X as an intersection of a plane through a bottom 10g of recess 18a.

The structural stability of element 10 is preferably enhanced by optional additional, preferably 4-32, here preferably 16 ribs 17d positioned, preferably regularly separated, preferably on the inner wall of part 10e, as can be seen best in the examples of FIGS. 1, 6, 7, and 12.

Figure 2:
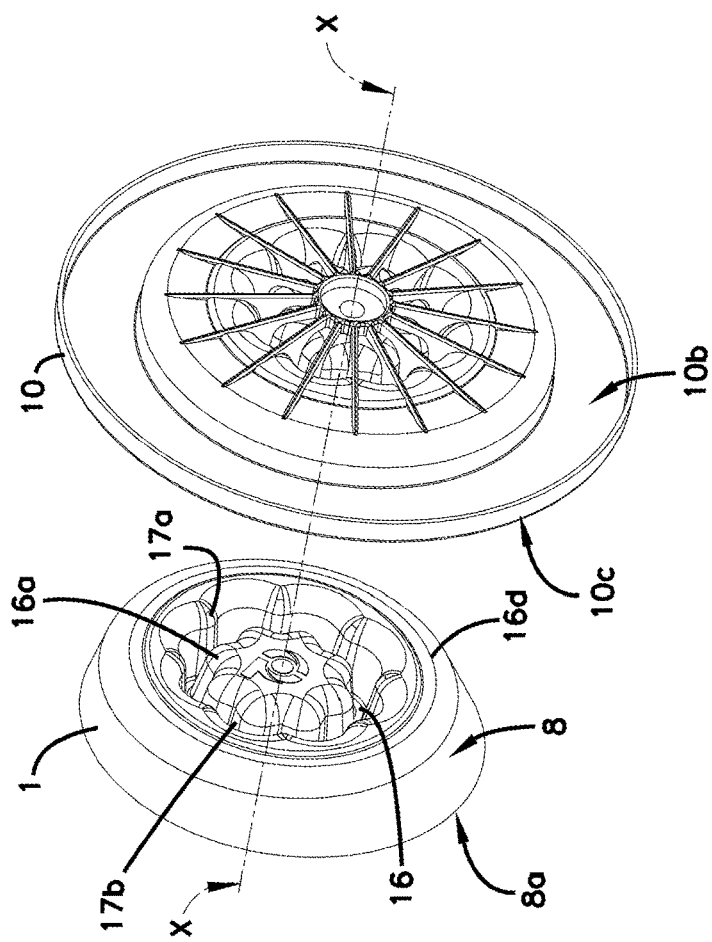
FIG. 2 is another exploded perspective view on the embodiment of FIG. 1.

FIG. 2 shows the first embodiment of FIG. 1 in another exploded respective schematic view, exploded along a central axis X of the structures. In particular, FIG. 2 shows the second surface area 8 of adapter 1. The second surface area 8 is ending at or onto an outer rim 8a. The outer rim 8a constitutes the outer perimeter of adapter 1. The second surface area 8 comprises a adapter-side three-dimensional structure 16 being non-rotationally coupleable with a complementary cartridge-side three-dimensional structure 18 of the surface area 10a of the cartridge-side coupling element 10 as shown in FIG. 1. In the embodiment of FIGS. 1 and 2 the adapter-side three-dimensional structure 16 on the second surface area 8 of adapter 1 comprises a smooth circular area 8b, FIG. 4, adjacent to outer rim 8a, and, when moving from the outer rim 8a towards the central axis X, on the opposite end of the smooth circular area 8b, a serpentine-like and continuous recess or groove 16 in the second surface area 8, see also FIG. 4.

Figure 4:
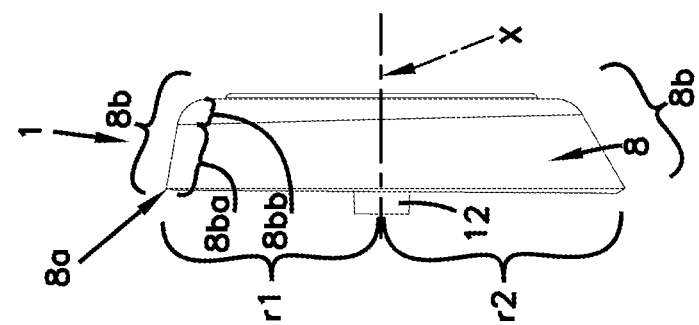
FIG. 4 is a side view on the adapter of FIG. 1.

As can also be seen in FIG. 4, the smooth area 8b has two main parts, a bigger, outer-most, slanted part 8ba being angled about 45 degrees (generally angles between about 25 to about 75 degrees are preferred) with respect to the central axis X, and a smaller, innermost part 8bb of area 8b being substantially normal relative to the central axis X.

Moving even more towards the central axis X there is then provided a central positive structure or projection 16a which is centrosymmetric about central axis X.

A possible structure and some possible exemplary details and dimensions of projection 18 and therefore also a respective possible structure and some possible exemplary details and dimensions of its complementary recess or groove 16 are described with respect to FIGS. 13, 14, and 14A further below.

In the whole disclosure, and in particular in all described embodiments, the position of the three-dimensional structures can be inverted, which means that the position of the projection and of the recess can be interchanged, in particular between adapter and end cap of the filter element.

Projection 18 fits into groove 16. This is for example clearly visible in the cross-sectional view of the second embodiment in FIG. 10. Both three-dimensional structures 16 and 18 are n-fold rotational symmetric three-dimensional structures with n=8.

Although it is shown in the depicted embodiment of FIGS. 1 and 2 that the second surface area 8 comprises one recess in the form of the serpentine-like continuous groove 16, it is also possible that more than one recess is provided in surface area 8. Also, it is possible that more than one projection 18 is provided on surface area 10a of the cartridge-side coupling element 10, and vice versa.

In another preferred embodiment, the cross-sectional shape of the groove 16 is such that it is not possible to insert a ring-like circular structure into such groove 16. With other words: In such a preferred embodiment, such groove 16 has such a structure that it is impossible to insert a projection 70 being a ring-like and circular projection into such groove 16. In such a preferred groove 16 only substantially correspondingly shaped structures can be inserted.

Figure 2B:
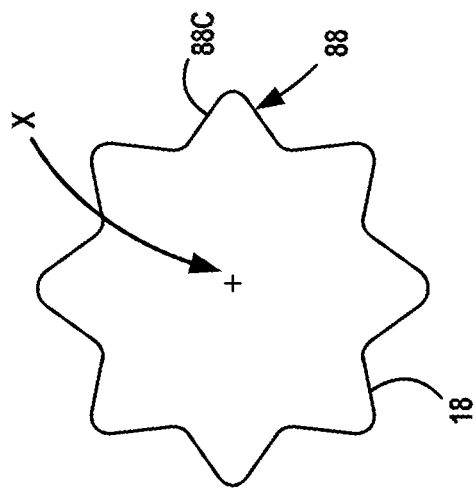
Figure 2A:
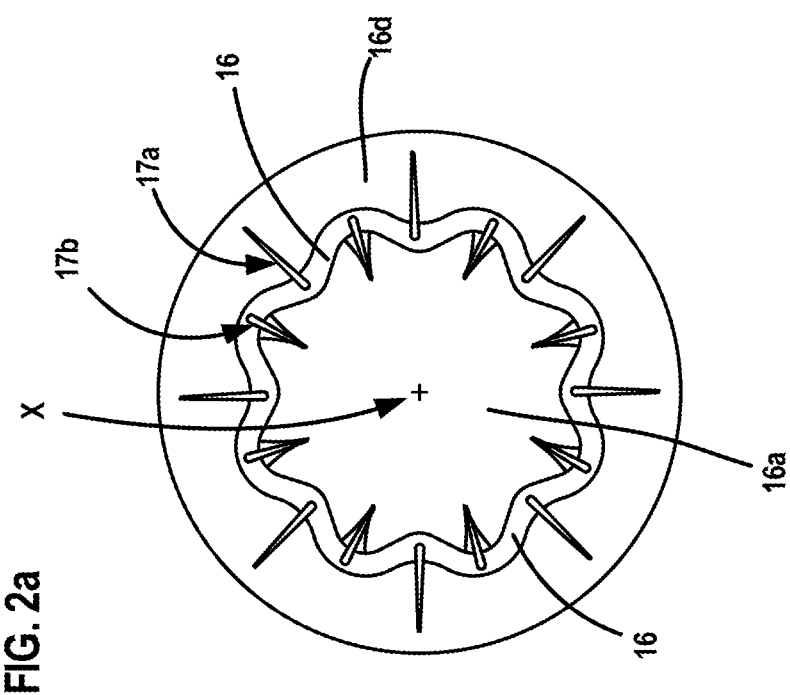
FIG. 2a is a schematic plan view on another embodiment second surface area of the adapter of the present invention.

FIG. 2a shows an example of such groove 16. FIG. 2a is a schematic plan view on another embodiment second surface area of the adapter 1 of the present invention. Groove 16 of FIG. 2a has a cross-sectional shape so that it is impossible to insert a ring-like and circular projection into groove 16. This aspect of groove 16 is preferably further emphasized by radially extending ribs 17b which extend radially from the radially outer-most parts of the curved and convex parts of the three-dimensional structure 16a in the middle of adapter 1. In groove 16 only substantially correspondingly shaped structure as for example shown in FIG. 2b can be inserted. Preferably, groove 16 is limited on its side which is opposite to the central area 16a by an outer wall or projecting structure 16d being similar to the outer structure 16d shown in FIGS. 2 and 5. To preferably further emphasize the afore-mentioned aspect of groove 16, also wall 16d preferably carries preferably radially extending ribs 17a which extend radially from the radially innermost parts of the curved and convex parts of an inner three-dimensional structure of wall 16d of adapter 1, in direction to the central axis X.

Figure 2E:
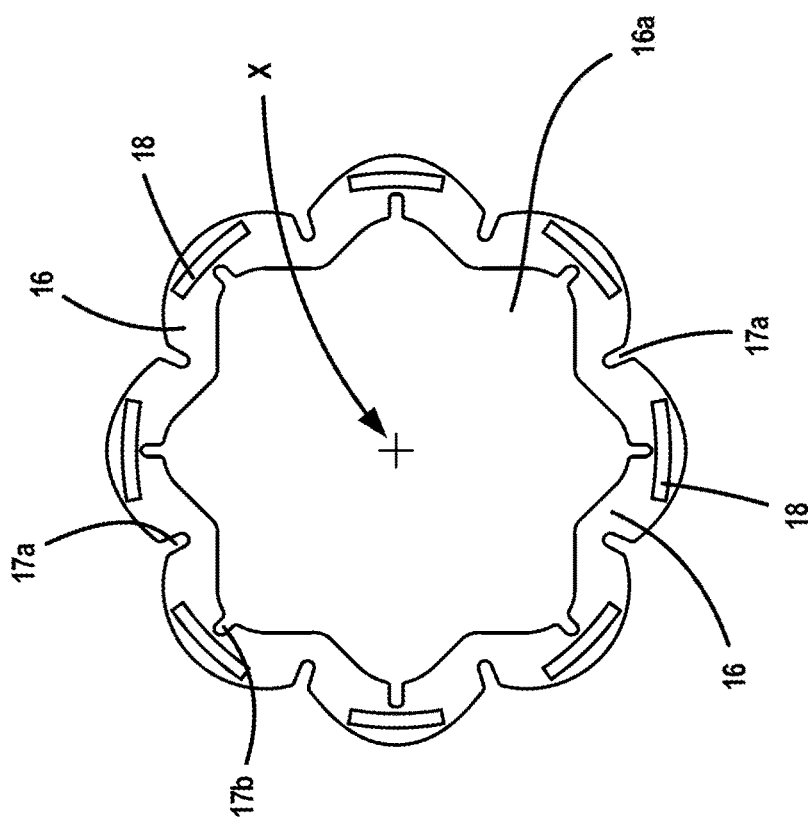
Figure 2D:
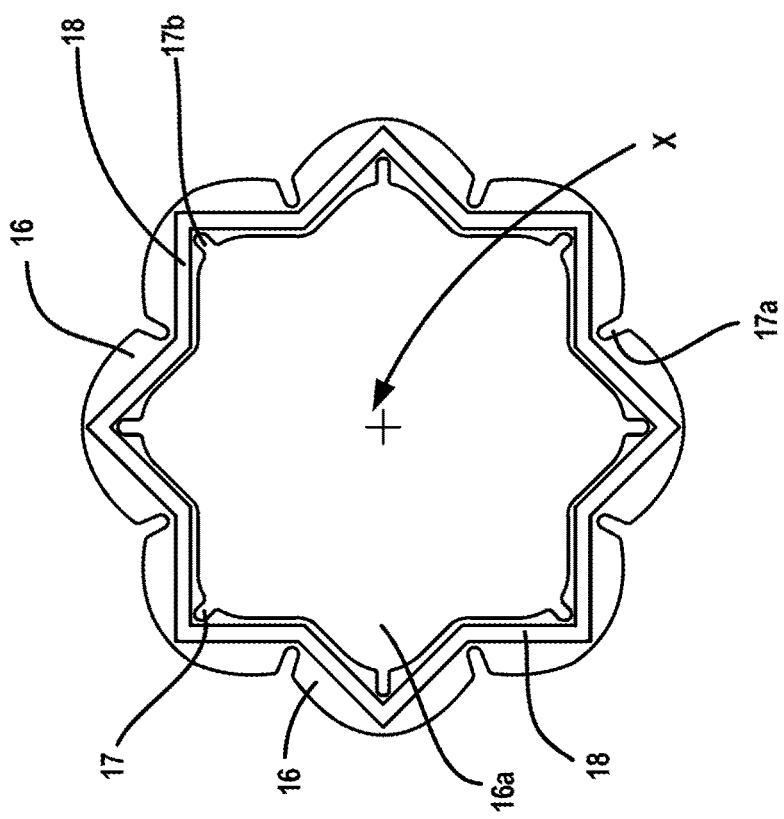

As best can be seen in FIGS. 2c, 2d, and 2e, these ribs 17a and 17b preferably cooperate with each other to preferably inhibit, more preferably completely inhibit, a rotation of the respective projection 18 of FIGS. 2c, 2d, and 2e. In particular in FIG. 2e the ribs provide for this inhibition of rotation of projection 18.

FIG. 2b is a schematic plan view on another embodiment of a cartridge-side coupling element of the coupling system of the present invention, being adapted to the second surface area of the adapter of FIG. 2a. The structure shown in FIG. 2b is a serpentine-like projection 18. The convex sections 88c of outer surface 88 of projection 18 are curved corresponding to the groove, see also the further detailed description of sections 88c of outer surface 88 of a similar projection 18 further below with respect to FIG. 13-14A.

FIG. 2c is a schematic plan view on an assembled coupling between the cartridge-side coupling element of FIG. 2b with the second surface area of the adapter of FIG. 2a. FIG. 2c shows in schematic form the interaction and non-rotatable coupling between the groove 16 of FIG. 2a and the projection 18 of FIG. 2b. It can be seen that projection 18 perfectly fits into groove 16.

FIG. 2d is a schematic plan view on another embodiment of an assembled coupling between a cartridge-side coupling element with the second surface area of the adapter of FIG. 2a. FIG. 2e is a schematic plan view on another embodiment of an assembled coupling between a cartridge-side coupling element with the second surface area of the adapter of FIG. 2a.

FIGS. 2d and 2e show schematically that it is also possible to change the alternating curved, in particular convex and concave, parts of the serpentine projections 18 as shown in FIGS. 1, 2, 2b and 2c into sharp edges, e.g. like at least one apex of a triangle. Such sharp edges can for example create a, preferably continuous, zig-zag shaped structure as shown in FIG. 2d, in particular a zig-zag shaped wall or projection 18. In FIG. 2d, the projection 18 is a continuous zig-zag shaped wall 18, the zig-zag shape when looking at a cross section through such wall as schematically depicted in FIG. 2d. By using such a zig-zag shaped projection 18 it is again also possible to insert such a projection 18 into a recess or groove 16 which has a shape so that a ring-like and circular projection cannot be inserted into such recess or groove 16.

As always in tis disclosure, the positions of projection 18 and recess/groove 16 can be interchanged from cartridge-side to adapter-side, and vice versa.

Also it is possible that the cartridge-side three-dimensional structure and/or the adapter-side three-dimensional structure show(s) both a projection and a recess/groove.

FIG. 2e shows that the projection 18 and/or the recess can be non-continuous, for example by using only the depicted wall sections for the projection 18, and/or by using only not-shown groove sections for the recess/groove. The depicted wall sections can prefer-ably be positioned on a virtual circle. In FIG. 2e the groove 16 is shown continuous.

Additionally, as in particular can be seen in FIGS. 2 and 2a, the depicted embodiments also shows a central projection 16a being for itself an 8-fold-rotational symmetric adapter-side three-dimensional structure. This structure fits into a respective recess 18a within projection 18 on the surface area 10a of the cartridge-side coupling element 10.

It is also sufficient to reach the goals of the present invention to have only projection 16*a* and recess 18*a*.

Vice versa it is also possible to have projection 18 on the surface area 8 and to have groove 16 on surface area 10*a* of the cartridge-side coupling element 10.

Figure 3:
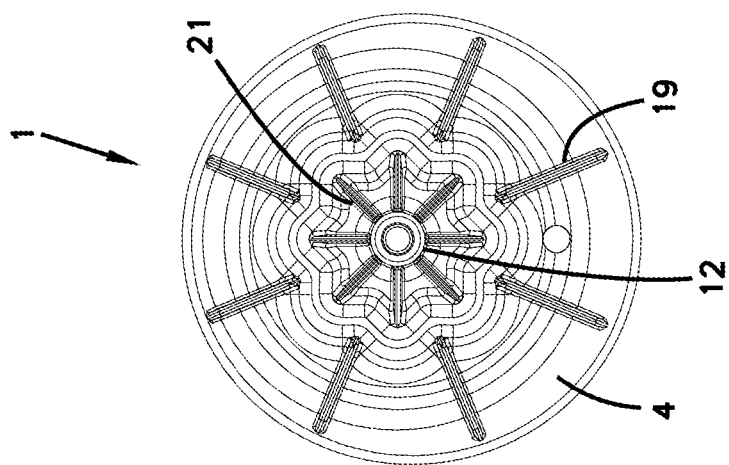
FIG. 3 is a plan view on the first surface of the adapter of FIG. 1.

FIG. 3 shows a plan view on the first surface area 4 of adapter 1 of FIG. 1. Preferably ribs 19 and 21 are provided which preferably serve to enhance the structural stability of projections 16*d* and 16*a*, respectively, of adapter 1, see also FIGS. 1, 2 and 5.

Figure 5:
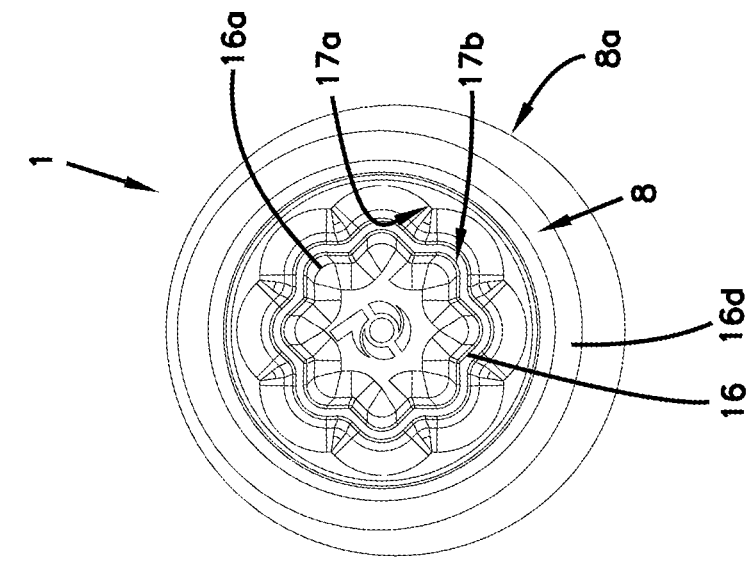
FIG. 5 is a plan view on the second surface of the adapter of FIG. 1.
Figure 6:
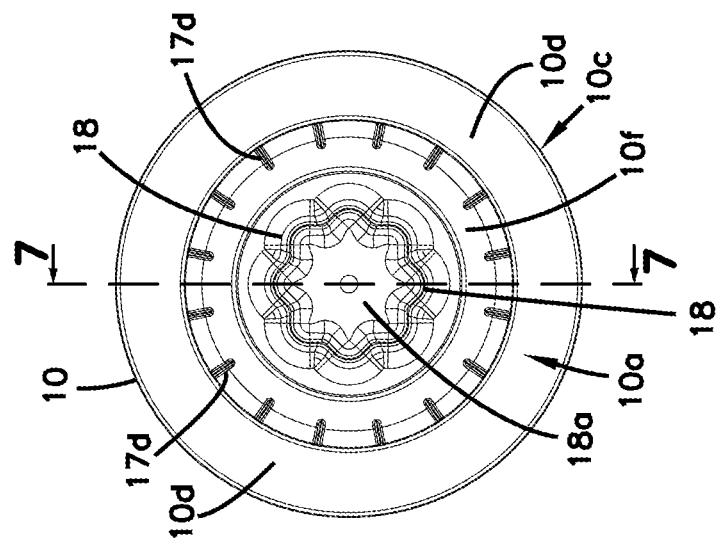
FIG. 6 is a plan view on the cartridge-side coupling element of the coupling system of FIG. 1.

FIG. 4 shows a side view on adapter 1 of FIG. 1. FIG. 5 shows a plan view on the second surface area 8 of adapter 1 of FIGS. 1 and 2. FIG. 6 shows a plan view on the surface area 10*a* of the cartridge-side coupling element 10 of the coupling system 2 of FIG. 1. FIG. 7 shows a side view on the cartridge-side coupling element 10 of FIG. 1.

It can also be seen in FIGS. 4-7, as indicated above with respect to FIGS. 1 and 2, that the adapter-side three-dimensional structure 16 on the second surface area 8 of adapter 1 comprises a smooth circular area adjacent to outer rim 8*a*.

As shown in FIG. 4, the outer rim 8*a* is asymmetrical in that preferably the radius r1 ex-tending to the topmost part of outer rim 8*a* shown in FIG. 4 is shorter than the radius r2 extending to the lowest part of outer rim 8*a* shown in FIG. 4, see also FIGS. 3, 5, 10 and 12.

It can be seen that the surface area 10*a* has an outer flat or plane part, on the inner side of which it is provided a ring part which steeply, preferably nearly in a right angle, slants down to the bottom 20*a* (see FIG. 12) of end cap 10. As also viewable in FIGS. 1, 6, 7 and 12, on the ring part which connects the bottom 20*a* with the outer flat part of surface 10*a*, there are provided a number of, here 16, reinforcement ribs to reinforce the whole end cap 10. The reinforcement ribs can preferably be arranged at regular angular intervals.

Figure 8:
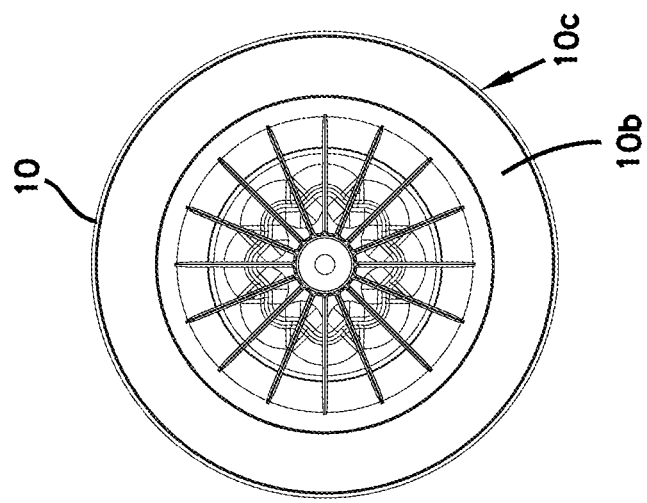
FIG. 8 is a plan view on the back side of the cartridge-side coupling element of the coupling system of FIG. 1.

FIG. 8 shows a plan view on the back side 10*b* of the cartridge-side coupling element 10 of FIGS. 1 and 2.

Figure 9:
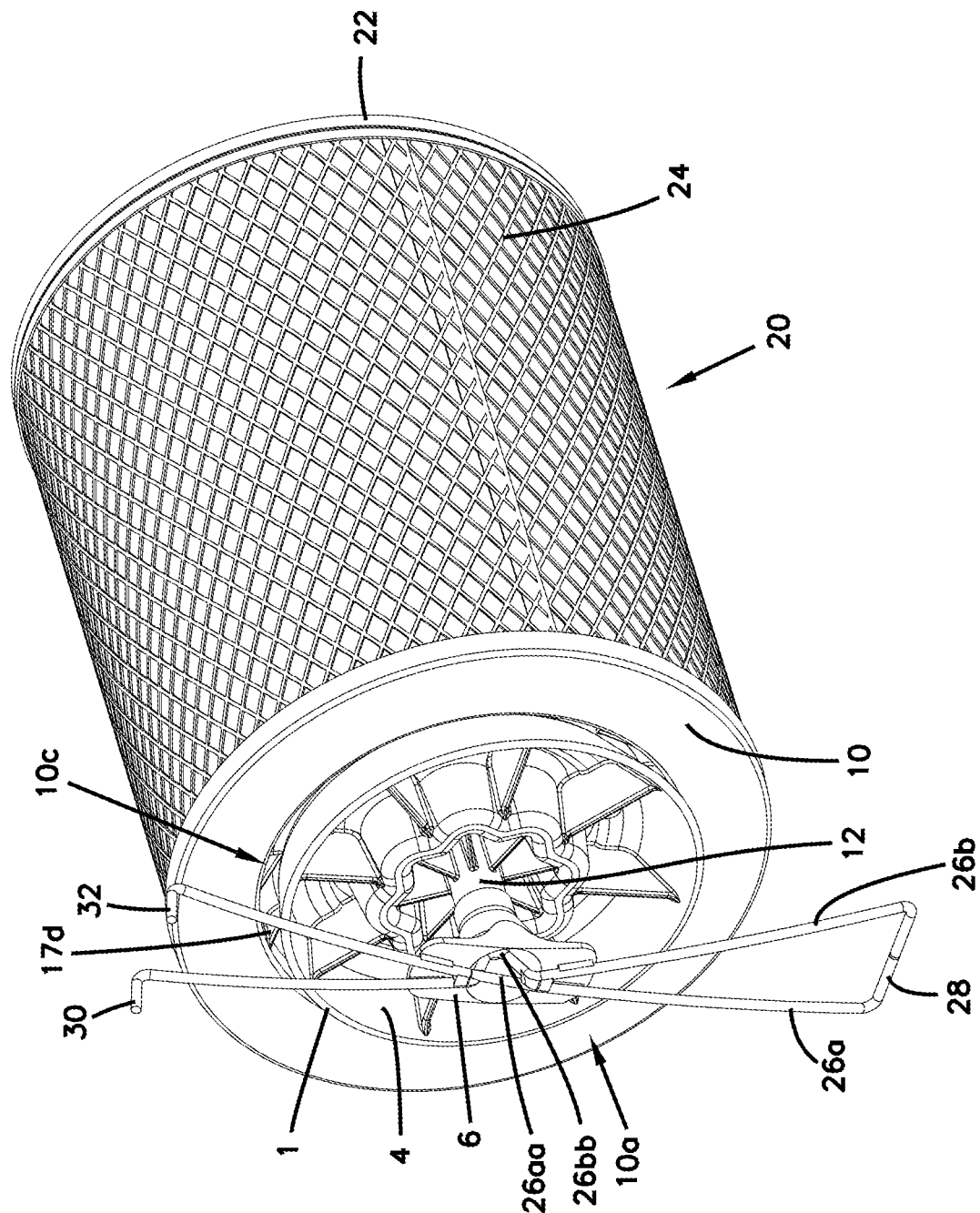
FIG. 9 is a perspective view on a second embodiment of the present invention.

FIG. 9 shows a second embodiment of the present invention in a perspective view. Those parts of the second embodiment of FIG. 9 which are shown with the same reference numerals as of FIG. 1-8 are not described here again.

Figure 15:
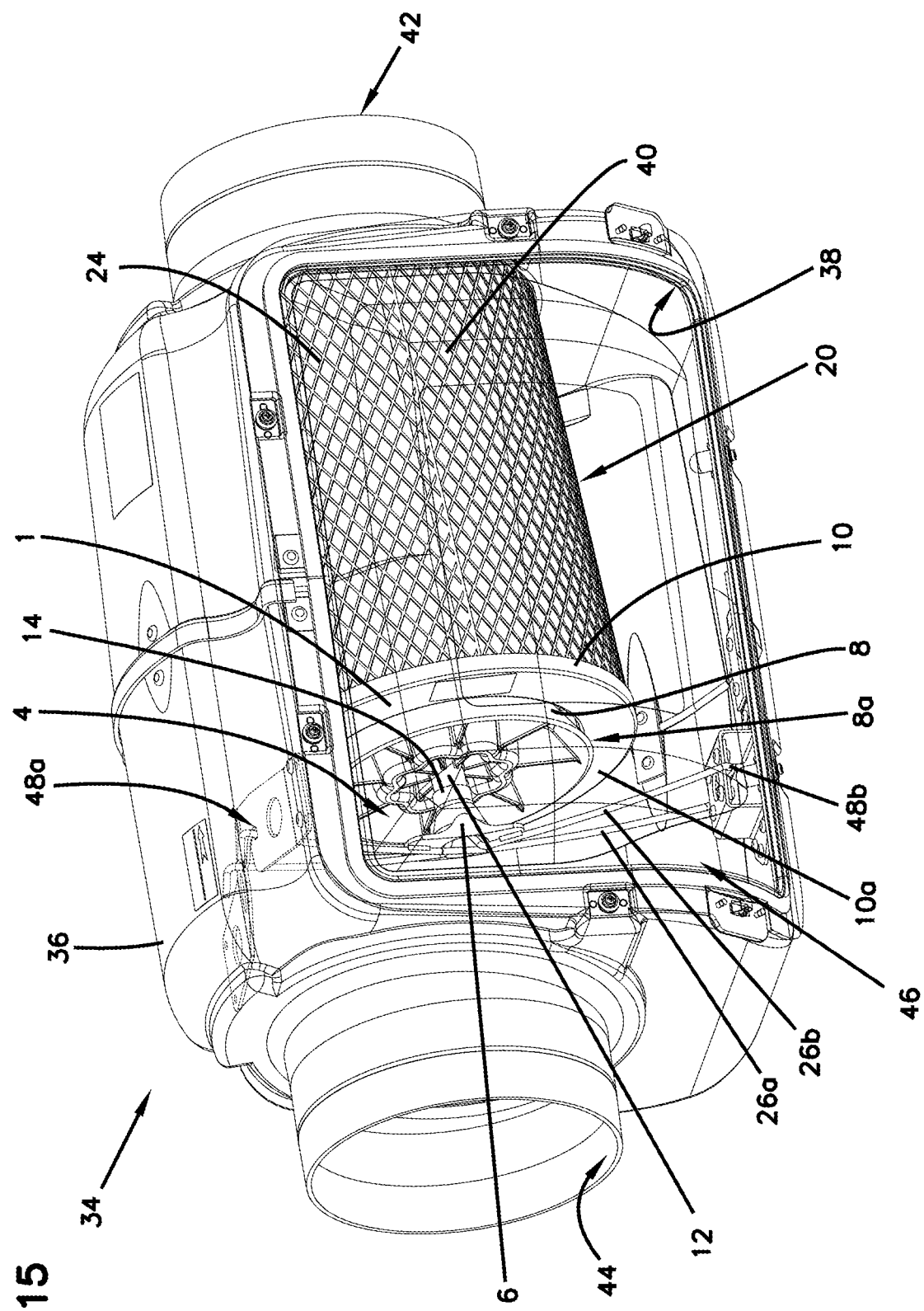
FIG. 15 shows an air filter assembly with a cartridge of the embodiment of FIG. 9, and with a housing.

A difference to the embodiments as shown in FIGS. 1-8, is that the embodiment of FIG. 9 shows that the cartridge-side coupling element 10 is the closed end cap of an air filter cartridge 20. Air filter cartridge 20 comprises a filter media, e.g. media 40 as shown in FIGS. 15 and 16, positioned between closed end cap 10 and an open end cap 22 located on an end of the cartridge 20 opposite closed end cap 10. The filter media 40 is surrounded by a mesh-like outer liner 24 for stabilizing the air filter cartridge 20. In use, the depicted air filter cartridge 20 can be installed in an air filter assembly, e.g. the as-assembly 34 as shown in FIGS. 15 and 16, by putting the air filter cartridge 20 in a respective housing 36 of the air filter assembly 34 so that the open end cap 22 is in sealing contact with a surrounding of a outlet opening, e.g. an opening 42 as shown in FIGS. 15 and 16, of the housing 36 so that dirty air which enters the housing 36 through an inlet, e.g. an inlet 44 as shown in FIGS. 15 and 16, can enter the air filter cartridge 20 through the mesh-like outer liner 24 and is then filtered by the filter media 40 and then enters an interior of the air filter cartridge 20, for example an interior 20*a* as shown in FIGS. 10 and 12 and 15 and 16, described below, so that such cleaned air can then exit from the interior 20*a* of the air filter cartridge 20 through the opening 42 in the open end cap 22 and through the outlet opening 44 of the housing 36 to be used further. The inverted air flow direction is also possible, i.e., dirty air flow flowing through opening 42 into interior 20*a*, then filtered by media 40, then entering an interior 46 of housing 36 and then leaving the housing 36 through opening 44.

Another difference to the embodiments shown in FIGS. 1-8 is that in the embodiment of FIG. 9 the housing-side coupling element 6 is releasably mountable in a housing, e.g. a housing of FIGS. 15 and 16, of a dedicated air filter assembly, e.g. an assembly of FIGS. 15 and 16, by comprising two flexible and spring-like wires 26*a* and 26*b*, which wires 26*a* and 26*b* are releasably fixable in the housing by hooking ends 28, 30 and 32 of wires 26*a* and 26*b* into respective openings in the housing, as e.g. shown in FIGS. 15 and 16, to releasably fix ends 28, 30, 32 in the respective openings. The wires 26*a* and 26*b* are flexible in a coupling direction of a coupling of the first surface area 4 with the housing-side coupling element 6 and/or of a coupling of the second surface area 8 with the cartridge-side coupling element 10.

Preferably, wires 26*a* and 26*b* are crossing each other substantially in their midpoints 26*aa* and 26*bb*. In particular, it is preferred that the air filter cartridge 20 is retained at a central position. On wires 26*a* and 26*b* is attached a receiver in the form of the housing-side coupling element 6 for being rotatably coupleable with the projection 12 on the first surface area 4 on adapter 1. Wires 26*a* and 26*b* carry the housing-side coupling element 6 in the form of a receiver in the area where they are crossing each other.

FIG. 10 shows a cross sectional view of a part of the second embodiment of FIG. 9. In this cross-section the interior 20*a* and the filter media 20*b* of the air filter cartridge 20 can be seen. It can be seen that the adapter 1 comprises an outer rim 8*a* which is non-circular, preferably oval, more preferably asymmetrical. The outer rim 8*a* can also be elliptical.

As for example shown in FIG. 4, the outer rim 8*a* is asymmetrical in that preferably the radius r1 extending to the topmost part of outer rim 8*a* shown in FIG. 4 is shorter than the radius r2 extending to the lowest part of outer rim 8*a* shown in FIG. 4.

In another—not shown embodiment—the outer rim 8*a* is circular but its center is off-center which means that the circle center of the outer rim 8*a* is not located on the center of the adapter-side three-dimensional structure 16 on the surface area 8.

Preferably, outer rim 8*a* has a greater outer diameter than the inner rim 10*c* (see FIGS. 9 and 10) surrounding the flower shaped projection 18 on the end cap 10. But at least a part of the outer diameter of the adapter 1 has to fit inside the inner diameter 10*c*. The ribs viewable in FIGS. 1, 6, 7 and 12 (and partly also viewable directly below the arrow head of the arrow of the line of reference 10*c* in FIG. 9) can further reduce the inner diameter available for the insertion depth of the adapter 1 into the space inside the end cap 10 down to its bottom 20*a*.

However, in a not-shown embodiment, the outer rim can be completely circular, the center of the respective circle preferably being off-center with respect to the center of the end cap.

Figure 10A:
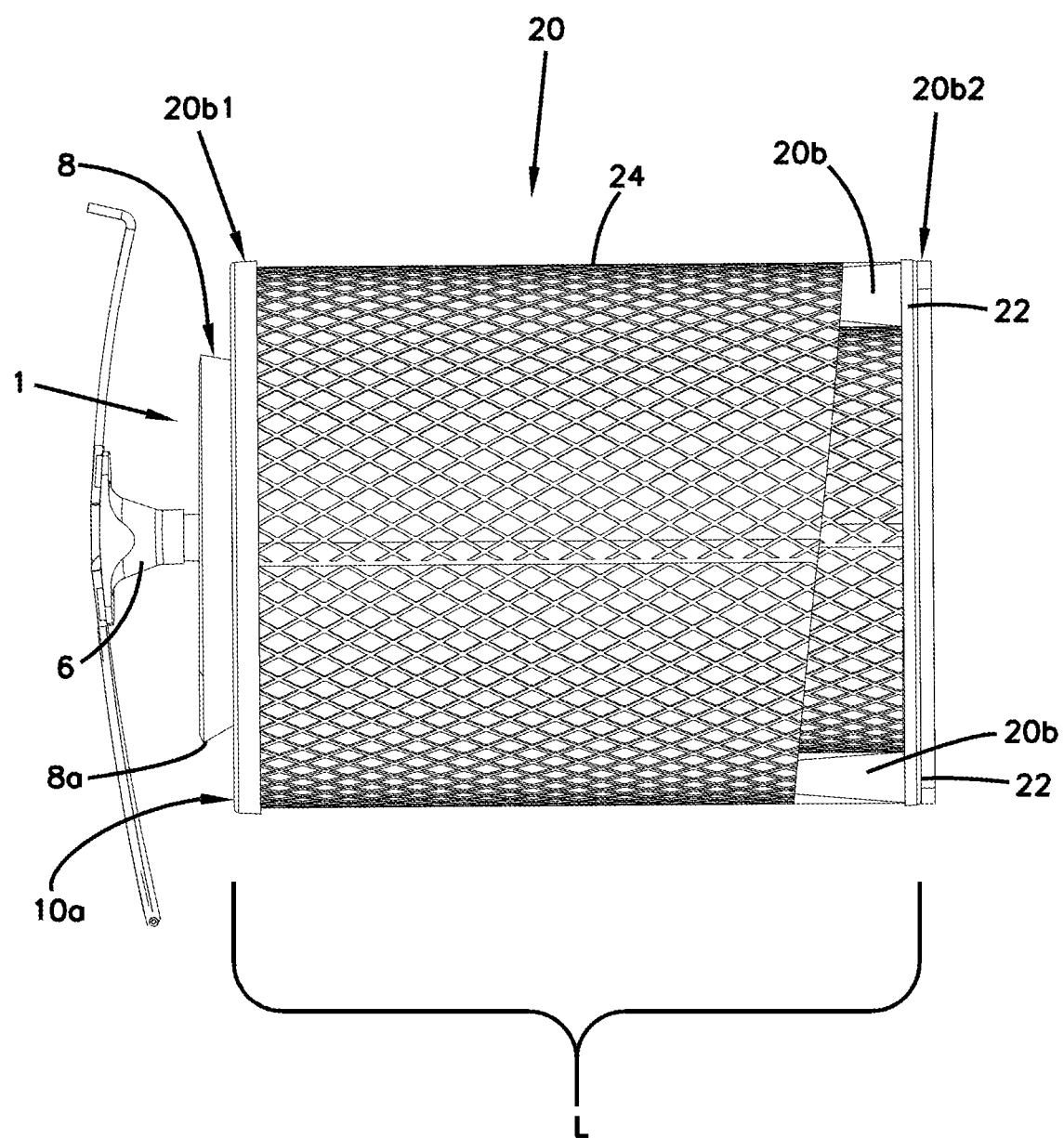
FIG. 10a is a side view of the cartridge 20 engaged with the adapter 1 and showing portions broken away.

As can be seen best in FIGS. 10, 10*a* and 16, but also in FIGS. 9 and 12, the cartridge-side coupling element 10 comprises the three-dimensionally structured surface area 10*a* facing away from the second end cap 22. The shortest distance SD between the three-dimensionally structured surface area 10*a* and a second end (20*b*2) of the media pack 20*b* is, preferably between about 1, about 3, about 5 or about 10% and about 20, about 25 or about 30%, shorter than the axial length L of the filter media pack 20*b*, defined between a first end 20*b*1 and the second end 20*b*2 of the filter media pack 20*b*. There-fore, the mass of the air filter cartridge 20 is less spread out over the length of the air filter cartridge 20 but more centered. Also, by the afore-mentioned positioning of the lowest part of the three-dimensionally structured surface area 10*a* inside the interior 20*a* surrounded by the filter media pack 20*b*, the total overall outer length of the air filter cartridge 20 is reduced. As can also be seen in FIGS. 10, 12 and 16, a longest distance LD between the surface area 10*a* and the second end 20*b*2 of the filter media pack 20*b* is, preferably between about 1, about 3, about 5 or about 10% and about 20, about 25 or about 30%, longer than the length L of the filter media pack 20*b*, defined between its first end (20*b*1) and its second end (20*b*2). Therefore, a part of the cartridge-side three-dimensional structure 18 of the surface area 10*a* of the cartridge-side coupling element 10 is located axially outside the length of the air filter cartridge 20 if measured between the first end cap 10 and the second end cap 22. The cartridge-side three-dimensional structure 18 of the surface area 10*a* of the cartridge-side coupling element 10 can at least partially, or only partially protrude from the first end cap 10, or from the filter media 20*b*. But this is preferred, only. Projection 18 can be positioned in a axial range along axis X between 50% (or 60 or 70 or 80 or 90) and 130% (or 80 or 90 or 100 or 110 or 120), not excluding other ranges, of the length L of the air filter cartridge 20 defined between the first end cap 10 and the second end cap 22, measured from the second end cap 22 towards the first end cap 10. The requirement that projection 18 is "positioned in an axial range along axis X" means that LD is located in that axial range and that the part of back side 10*b* being nearest to end cap 22 is located in that axial range. In another preferred embodiment such axial position of projection 18 is coordinated with the ranges for SD and LD. In particular, it is an option that LD is equal or shorter than L so that the whole projection 18 is located within the inner volume 20*a* defined by the media pack 20*b*.

Figure 11:
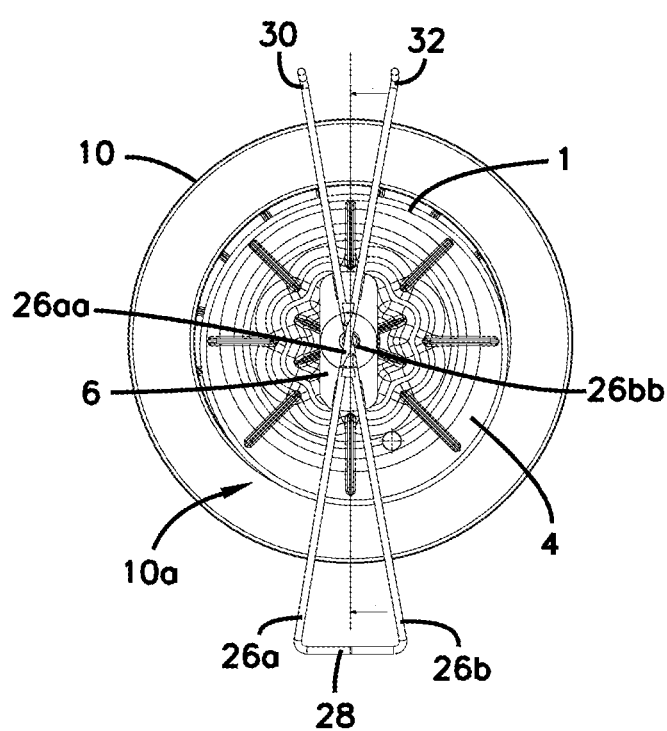
FIG. 11 is a plan view from the left side on the embodiment of FIGS. 9 and 10.

FIG. 11 shows a plan view on the second embodiment of FIG. 9 from the left side of FIG. 10.

FIG. 12 shows a partially exploded view of the part of the second embodiment as shown in FIG. 10.

Figure 13:
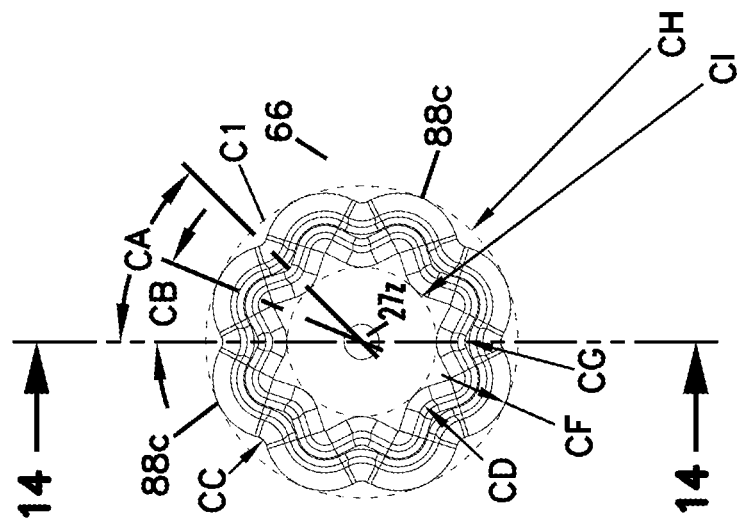
FIG. 13 is a fragmentary, schematic outside end view toward the closed end cap 10 of FIGS. 9-12.

In FIG. 13, a fragmentary, schematic outside end view toward the closed end cap 10 of cartridge 20 of FIGS. 9-12 is provided. The end view of cartridge 20 is taken directed toward end cap 10. Thus, the structural surface viewable in FIG. 13 is a central part of exterior surface area 10*a* of end cap 10, FIGS. 9-12.

In FIG. 13, example dimensions and angles are follows: CA=45°; CB=22.5; CC=3.3 mm radius; CD=5.4 mm radius; CF=16.8 mm radius; CG=3.5 mm radius; CI=41.6 mm diameter; and, CH=87 mm diameter. But the embodiment shown in FIG. 13 is not limited to these dimensions and angles.

Figure 14:
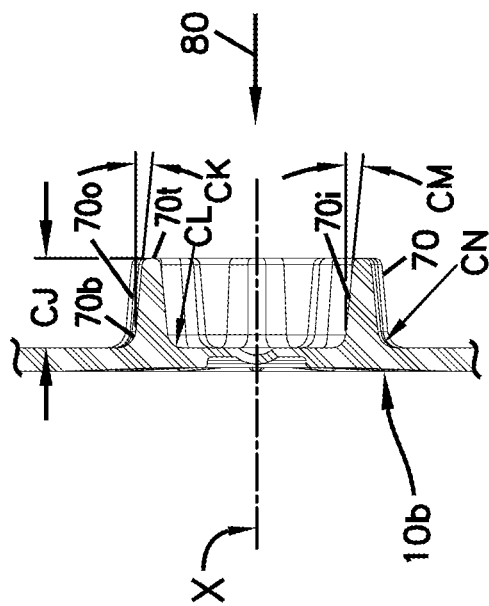
FIG. 14 is a fragmentary, schematic, cross-sectional view taken generally along line 5-5, FIG. 13.

In FIG. 14, a fragmentary cross-sectional view is taken along line 14-14, FIG. 13. Here both an exterior surface area 10*a* and an interior surface area 10*b* are viewable in end piece 10.

Referring to FIG. 14, the depicted central portion of end cap outer surface area 10*a* includes thereon the cartridge-side three-dimensional structure 18 as a projection arrangement 70. In general terms, the projection arrangement 70 projects from a remainder of end cap 10, in a direction away from the end cap 10; i.e., in a general direction away from opposite end cap 22. The distance of projection 70 indicated at dimension CJ, FIG. 14, is typically at least 10 mm, usually at least 15 and often within the range of 20 to 40 mm. In the example depicted, the dimension CJ is 25 mm.

The direction of projection 70 is generally axial, i.e., in the direction corresponding to the general direction of central axis X, and away from end cap 22. By "axial" in this context, it is not meant that the projections of outer and inner surfaces 70*o*, 70*i* of projection 70 are necessarily precisely parallel to axis X. Indeed each can be angled from axis X somewhat.

Typically outer surface 70*o* slants inwardly, along a direction of extension from an adjacent region of end cap 10; and, inner surface 70*i* slants outwardly along its direction of extension from an adjacent region of end cap 10. This angle of slant inwardly of surface 70*o* is indicated at CK, and is generally within the range of 3-7°; inclusive. The corresponding angle of extension outwardly surface 70*i* is indicated at CM and typically within the range of 3-7°; inclusive. In the example depicted, FIG. 14, CK and CM are each 5.6°.

Angles to surfaces 70*o*, 70*i* of the type indicated, provide the projection 70 with an axially outermost tip 70*t*, which is narrowed somewhat relative to a base region 70*b* of projection 70. A somewhat narrow tip 70*t* facilitates insertion into the groove formed between walls 16 and 16*a* of adapter 8, described above.

In particular, and preferably separate from the above, it is preferred that tip 70*t* is a rounded surface to facilitate insertion into the groove 16 of adapter 8, or with other words: tip 70*t* comprises a rounded surface to facilitate a non-rotational coupling be-tween the cartridge-side three-dimensional structure 18 or projection 70 and the adapter-side three-dimensional structure or groove 16 on the adapter 8 of the coupling system 2 is performed, or vice versa.

In particular, and preferably separate from the above, it is preferred that tip 70*t* comprises a rounded surface to provide an auto-alignment when an insertion of projection 70 into the groove 16 of adapter 8 is performed, or with other words: tip 70*t* comprises a rounded surface to provide an auto-alignment when a non-rotational coupling between the cartridge-side three-dimensional structure 18 or projection 70 and the adapter-side three-dimensional structure or groove 16 on the adapter 8 of the coupling system 2 is performed, or vice versa.

Figure 14A:
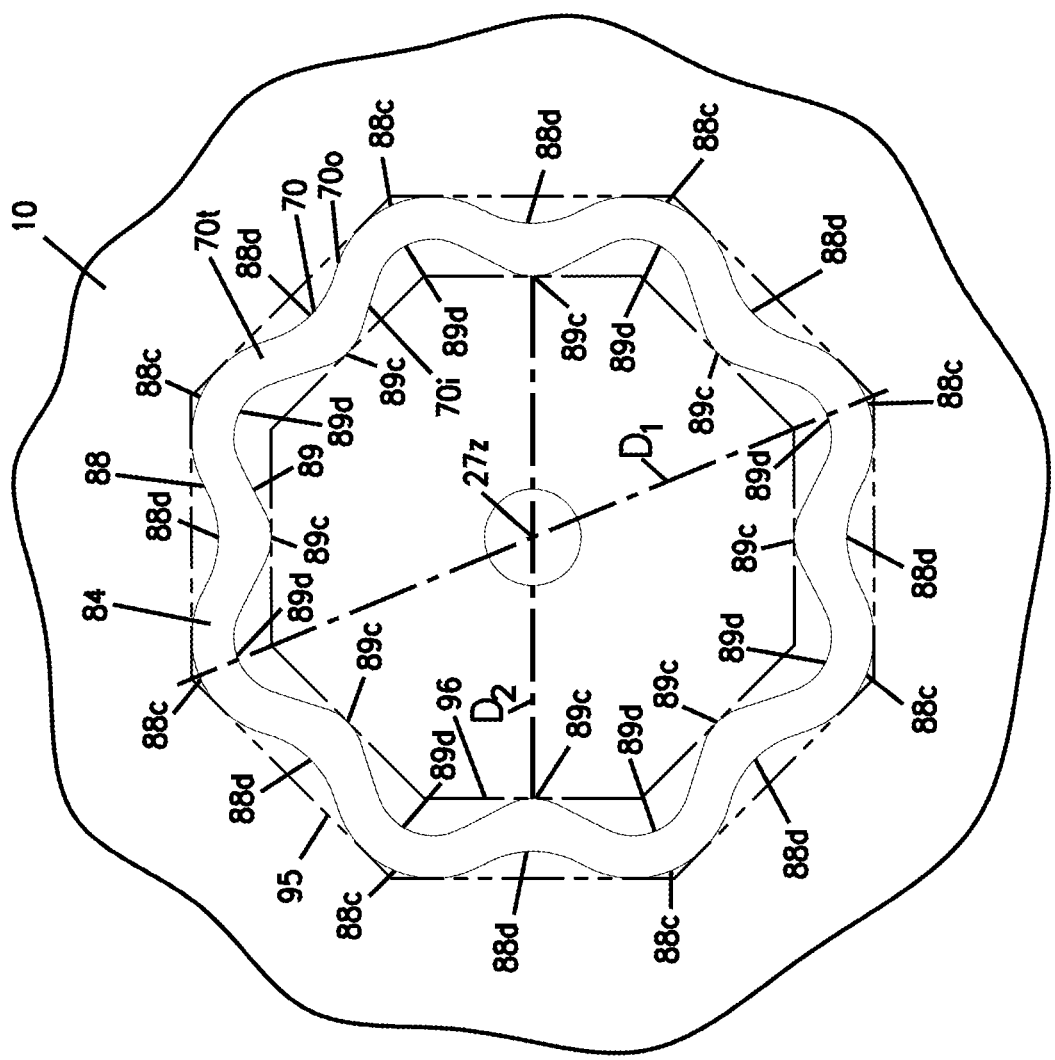
FIG. 14A is a schematic, fragmentary, enlarged, view of a portion of the surface depicted in FIG. 13.

Attention is now directed to FIG. 14A, a schematic, fragmentary, plan view of projection arrangement 70 taken in a general direction of arrow 80, FIG. 14. It is noted that in FIG. 14A, the schematic depiction provides the general shape of projection 70 in plan view, and does not account for a slant to sides 70*o*, 70*i*.

Referring to FIG. 14A, although alternatives are possible, the particular projection arrangement 70 depicted preferably comprises a continuous wall 84. By "continuous" in this context, it is preferably meant that there are no gaps in the wall 84 with respect to extension around the perimeter defined by the wall 84; i.e., around center 27*z*.

Also, although alternatives are possible, the wall 84 is preferably completely "closed." By this it is meant that the wall 84 preferably includes no apertures therethrough, in its continuous extension.

Referring to FIG. 14, the cross-section, it is also noted that for the particular example depicted, the projection 70 is preferably "solid" throughout; i.e. preferably does not have a hollow interior between surfaces 70*o*, 70*i*, although alternatives are possible.

The projection arrangement 70 preferably has a minimum largest external dimension thereacross, corresponding to dimension D1, FIG. 14A of at least 35 mm and more preferably within the range of 40 to 100 mm. A advantage of this is that it facilitates engagement with the access cover 4, in a typical preferred arrangement.

The particular wall 84 depicted surrounds an open and recessed interior surface section 85. This section preferably has a smallest internal dimension access shown at D2, of at least 15 mm typically at least 20 mm and more preferably within the range of 30 to 90 mm.

Preferably, projection 70 is configured around center 27z such that the minimum largest dimension thereacross indicated at D1, can be measured in at least two directions at right angles to one another; i.e., D1 indicated in FIG. 14A would preferably also indicate a minimum largest dimension in a direction perpendicular to line D1. Preferably the configuration of the objection 70 is such that the smallest inside dimension thereacross, indicated at D2, is met in two directions, the first direction being for example as indicated at line D2, and a second dimension taken perpendicular to the first dimension.

Typically the projection 70 has a depth of extension from its tip 70t over a distance of at least 6 mm (and preferably at least 12 mm) in which the thickness of projection 70 preferably does not exceed 10 mm, but is more preferably at least 4 mm (discounting tapering at the very tip.) This would be for example a width between walls 70i, 70o, extending inwardly from tip 70t preferably at least a depth of 25% and more preferably at least 35% of its extent of projection. Of course near the base 70b, FIG. 14, projection 70 may thicken (widen) somewhat.

The particular, closed, continuous wall 84 depicted, preferably has a serpentine outer surface 88 and preferably has a serpentine inner surface 89, corresponding to surfaces 70o, 70i respectively. By "serpentine" in connection with the outer surface 88, it is meant that extension around center 27z, outer surface 88 does not define a series of straight lines or even a circle, but rather a series of alternating inner and outer curves.

For the example shown serpentine surface 88 preferably comprises a plurality of radially outwardly facing convex sections 88c, and a plurality of radially outwardly facing con-cave sections 88d alternating with one another.

Referring to outer surface 88, the reference to a "radially outwardly facing convex section 88c" is meant to refer to a section of surface 88 which curves outwardly; and the reference to "radially outwardly facing concave sections 88d" is meant to refer to a section of surface 88 which curves inwardly.

Analogously, radially inwardly facing inner surface 89 is preferably also serpentine, comprising a plurality of radially inwardly facing convex sections 89c and radially inward-ly facing concave sections 89d, alternating with respect to one another, as the inner surface 89 extends around center 27z.

For the example depicted, each concave section 89d of inner surface 89 corresponds with, and aligns radially with, a convex section 88c of outer surface 88; and, each convex section 89c of inner surface 89 is aligned radially with concave section 89d of outer surface 88.

For the particular example shown, wall 84 preferably defines, in each of the outer surface 88 and inner surface 89, eight concave sections and eight convex sections. Further: (a) preferably a curvature of each convex 88c section of surface 88 is the same as each other convex section 88c in surface 88 and, (b) preferably a curvature of each concave section 88c is the same as each other concave 88d. The same is preferably true for each cover section 89c and each concave section 89d. The result is a regular "petal" shape to projection 70.

By the term "petal" in this context, it is meant that when viewed in plan view, the projection 70 can be seen to have a plurality of outwardly projecting petals, i.e., curved sections. By the term "regular" in this context, it is meant that each outwardly projecting petal has the same shape as each other outwardly projecting petal.

Referring to FIG. 14A, it is also noted that the center of each convex section 88c in the outer surface 88, preferably can be seen to define a vertex of an octagonal shape, indicated at phantom lines at 95. Further, each center point of each concave section 89c in surface 89 preferably defines a center point in a side of an internally positioned octagon depicted in phantom lines at 96. The octagons 95, 96 are preferably radially aligned, one spaced from the other.

In more general terms, serpentine projection 70 preferably comprises a plurality of out-ward convex petal sections and inward concave sections, preferably providing for a serpentine extension of wall projection 70 around center 27z.

Preferably the curvature of each outwardly directed convex section 89c is such as to have a smaller radius of curvature than a hypothetical curvature of such a section if directed on, or positioned on, a circle centered on center 27z. This is apparent by refer-ring to FIG. 13 and comparing the curvature of circle C1 to the curvature of outer convex sections 88c.

Referring to FIG. 14, the indicated dimensions are as follows: As previously discussed, CJ=25 mm; CK=5.6°; and CM=5.6°. In addition, CL=4 mm radius; and CN=5 mm radius.

FIG. 15 shows a further embodiment with an air filter assembly 34 comprising a cartridge 20 of the embodiment of FIG. 9, and with a housing 36. Housing 36 is shown partly open at an aperture 38 which can be closed by a not shown cover, in use. Cartridge 20 is shown as in FIG. 9, i.e., the cartridge 20 is held in position for use by the adapter 1 with its first surface area 4 being rotatably coupled with the housing-side coupling element 6 of the coupling system 2, and with its second surface area 8 being non-rotatably coupled with a cartridge-side coupling element 10 (=closed end cap of cartridge 20) of the coupling system 2. Air filter cartridge 20 comprises a filter media 40 positioned between the closed end cap 10 and the open end cap 22 located on an end of the cartridge 20 opposite closed end cap 10. The filter media 40 is surrounded by a mesh-like outer liner 24 for stabilizing the air filter cartridge 20. Cartridge 20 is installed in the air filter assembly 34 by putting the air filter cartridge 20 in the housing 36 so that the open end cap 22 is in sealing contact with a surrounding of an outlet opening 42 of the housing 36 so that dirty air which enters the housing 36 through an inlet 44 can enter the air filter cartridge 20 through the mesh-like outer liner 24 and is then filtered by the filter media 40 and then enters the interior 20a of the cartridge 20 so that such cleaned air can then exit from the interior 20a through the opening 42 in the open end cap 22 and through the outlet opening 44 of the housing 36 to be used further.

The inverted air flow direction is also possible, i.e., dirty air flow flowing through opening 42 into interior 20a, then filtered by media 40, then entering an interior 46 of housing 36 and then leaving the housing 36 through opening 44.

The housing-side coupling element 6 is releasably mountable in the housing 36 by comprising two flexible and spring-like wires 26a and 26b, which wires 26a and 26b are releasably fixable in the housing 36 by hooking ends 28, 30 and 32 of wires 26a and 26b into respective openings 48a, 48b in the housing 36 to releasably fix ends 28, 30, 32 in the respective openings 48a, 48, so that the openings 48a, 48b serve as fixation elements.

FIG. 16 shows a cross section of the air filter assembly 34 of FIG. 15 comprising the adapter of FIGS. 1-8, and comprising the air filter cartridge 20 of FIGS. 9-12.

Additional Comments, Figures, and Observations

In general, the above disclosure is found in EP 17170112, filed May 9, 2017, incorporated herein by reference. In this section, some additional comments and observations are made.

Referring first to FIG. 16, it is noted that the cartridge 20 includes depicted thereon a housing seal member 20r. The seal member 20r is pressed against the housing 36 where shown, to provide a housing seal for the cartridge. The housing seal member 20r is depicted as an extension, for example a ring, of resilient seal material or gasket appropriate for such use.

The type of housing seal depicted is generally characterized as "axial" in that the forces providing for the seal are provided along the direction of a longitudinal axis of the cartridge and housing, pressure being applied by the adapter or adapter system 6 depicted and described. Using an axial seal of the this type is advantageous, since it facilitates loading of the cartridge 20 into the housing from a side (i.e. toward a housing central axis X, FIG. 16) instead of an end. This type of side loading is what would be involved in a housing of the type of FIGS. 15 and 16, where a side panel is removable to allow access to an interior. Implementing a cartridge at the closed end in accord with the principles described herein, and an open end having an axial seal of the type characterized in the previous paragraph, as indicated is advantageous and facilitates side loading.

With such an arrangement, and referring to FIG. 16, preferably the housing does not include any projection therein extending toward the cartridge, especially toward a center of the cartridge, which would need to be "cleared" during installation. Also, preferably, the cartridge does not include any projections extending toward the housing, that would interfere with installation of the seal. Typically and preferably, the open end piece 22 is flat on the surface extending toward the outlet 42, except for the presence of the gasket 20r.

Thus, the housing preferably includes an end adjacent the second end of the filter media pack; that housing end having no projection thereon positioned spaced from an outer wall (surrounding the cartridge) and extending toward an opposite end of the cartridge and housing. In some more specific characterizations, it can be understood that the housing preferably includes no projection thereon that extends into an interior of the cartridge, adjacent the open end of the cartridge.

It is noted that the cartridge as described herein thus far, are implemented using preformed end pieces such as stamped from metal, or molded from plastic, attached to the cartridge, for example by a potting such as adhesive, or by sonic welding, etc. Alternatives are possible. Molded-in-place end pieces can be used in some applications of the present disclosure.

It is noted that the media is a matter of choice for the desired application. A variety of media types can be used including, for example: surface or barrier media (pleated or otherwise) such as made from cellulose fiber material (paper) or synthetic fiber material, or a mix; various open fibrous arrangements such as a high loft air laid media; and/or foam media. The media can be provided in multiple layers, with the layers being the same or different from one another. The media can be provided in wraps or coils of layers.

The media can optionally be provided with a gradient. For example, it can be provided in multiple layers, with a most upstream layer (or combination of layers) being more open and less efficient, and a more downstream layer being more efficient. Gradient media arrangements and the use of depth media to obtain desirable media characteristics (of gradient efficiency) are described, generally, in U.S. Pat. No. 5,423,892, incorporated herein by reference. Similar principles can be used in arrangements according the present disclosure.

Unless otherwise stated, the present application is not meant to be specific as to the choice of media and media configurations. The techniques can be used with any of a variety of media choices.

It is noted that in the example of FIG. 16, the media is depicted in three layers, but alternatives are possible.

Figure 17:
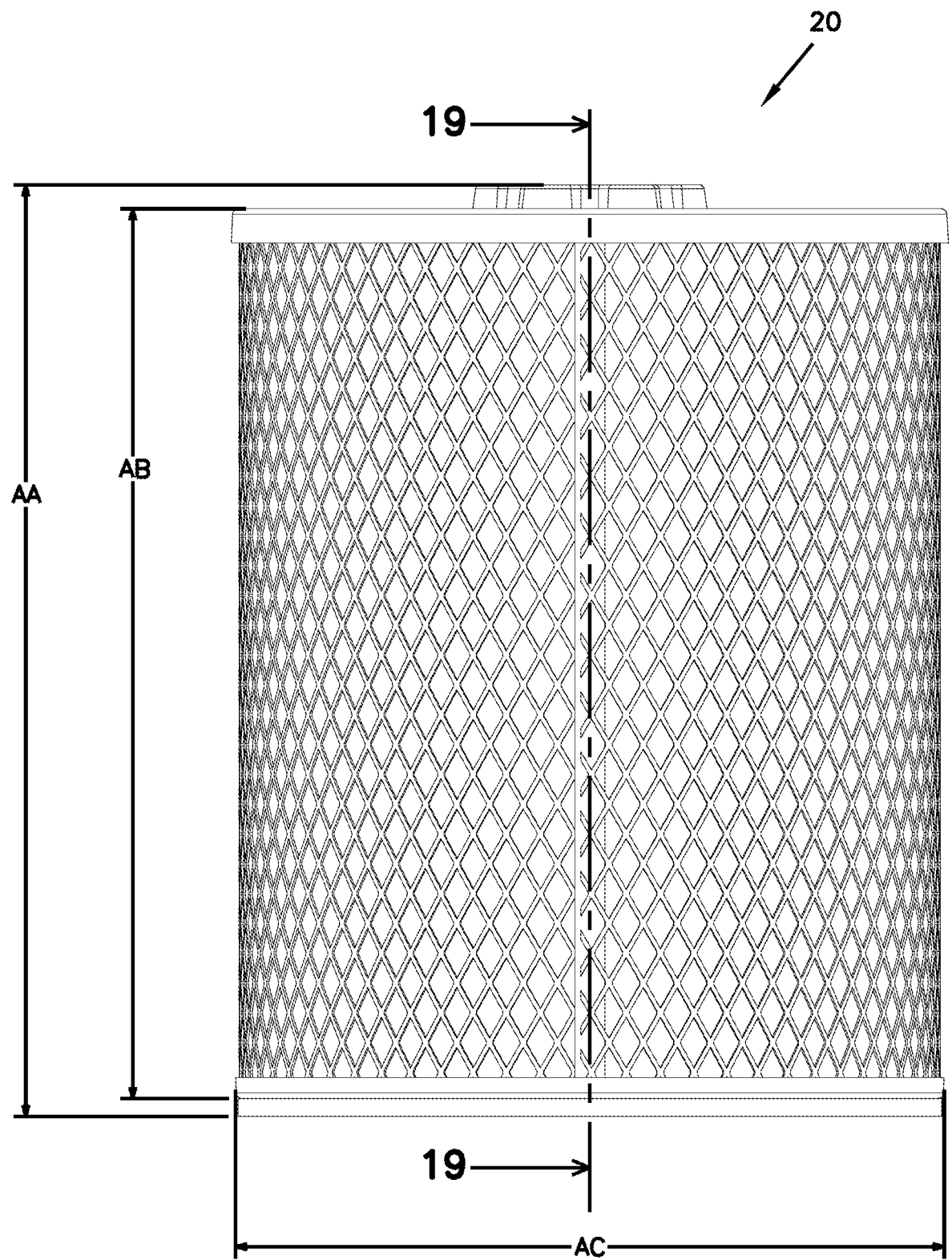
FIG. 17 is a side elevational view of a filter cartridge corresponding to the cartridge 20 of FIGS. 15 and 16.

In FIG. 17, a filter cartridge in general accord with the cartridge 20 is depicted. Example dimensions are provided. Of course, the application can be practiced in a variety of sizes. The example dimensions provided are as follows: AA=312.5 mm AB=298.5 mm; AC=238 mm; From these, it can be understood that the principles are well adapted to be used with small to medium size cartridges, for example of at least 150 mm in maximum length (e.g. 150-600 mm) and at least 150 mm in maximum cross-dimension (e.g. 150-600 mm). The techniques can be used with cartridges of alternate sizes, however.

Figure 18:
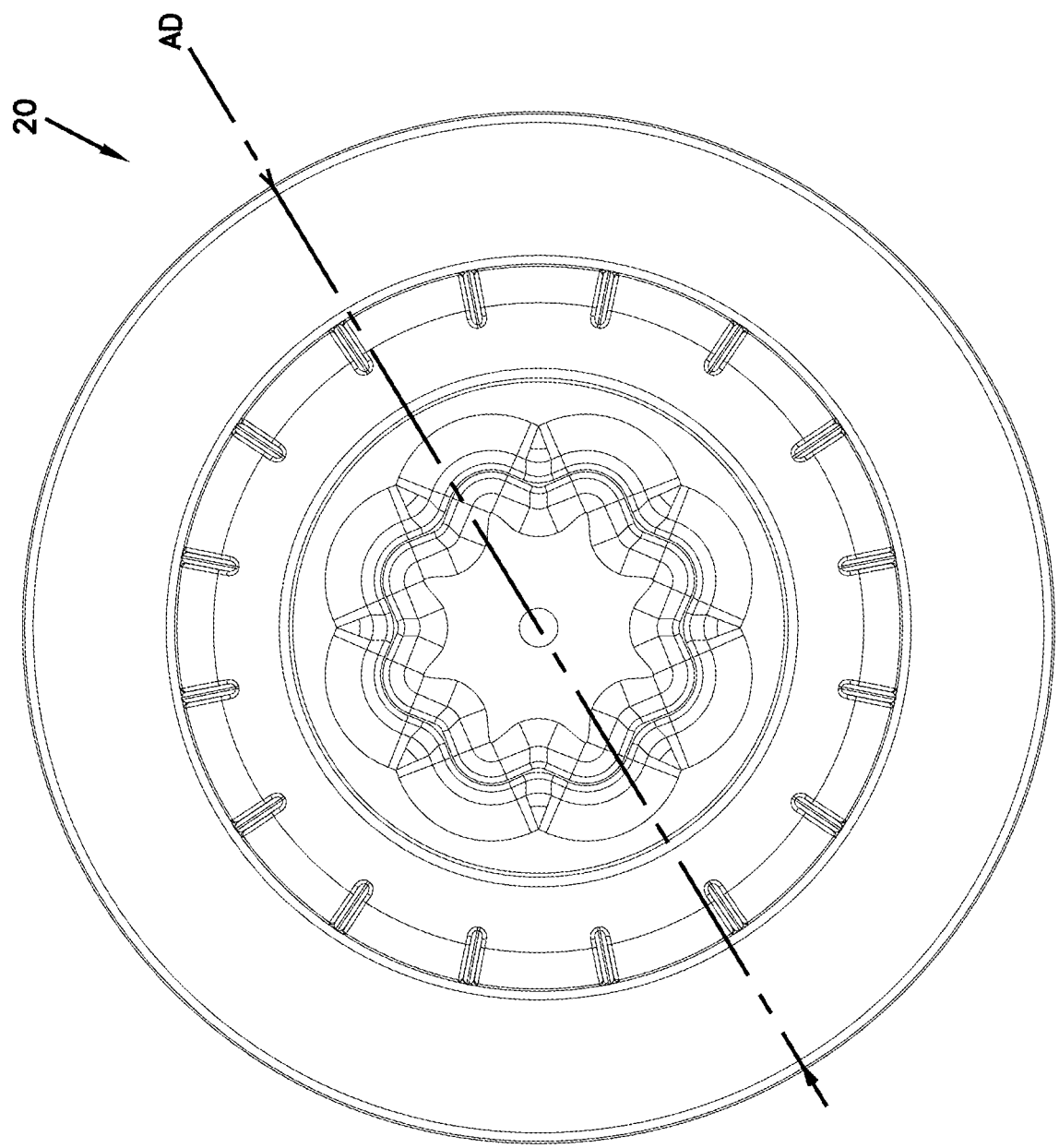
FIG. 18 is a closed end plan view of the cartridge of FIG. 17.

In FIG. 18, a closed end view of the cartridge 20, FIG. 17 is viewed. Dimension AD is indicated, and would generally be 240 mm. Again, alternatives are possible.

Figure 19:
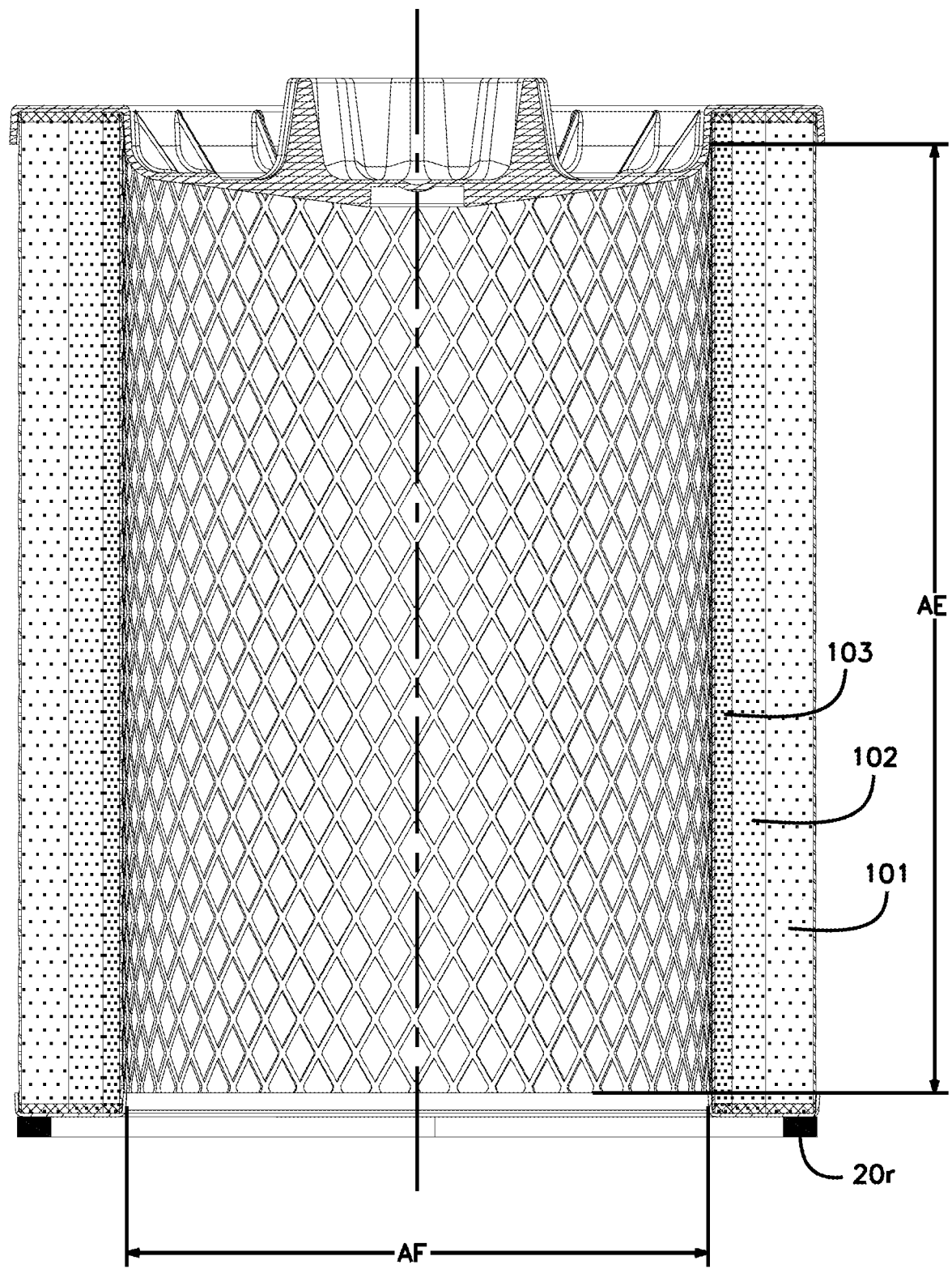
FIG. 19 is a schematic cross-sectional view of the cartridge of FIG. 17, taken along line 19-19, FIG. 17.

In FIG. 19, a cross-sectional view of cartridge 20 is depicted, taken along line 19-19, FIG. 17. The example dimensions are as follows: AE=280 mm; AF=171 mm. Of course, alternatives are possible.

In FIG. 19, seal member 20r is readily viewable as a seal ring or gasket secured to an end of the cartridge to provide an axial seal with a housing (or housing seal) when the cartridge is installed.

Referring to FIG. 19, the particular example media provided has three layers 101, 102 and 103. Again, alternatives, including in the number of layers, (e.g. one or more) are possible. In an example, each of the three layers is a foamed media, but alternative are possible. In an example layer 101 and 102 each comprise the same type of open cell polyester foam with a density of 21-31 kg/m3, and cell of about 1650 micron-2150 micron (approximate cell diameter) and a population of about 30 ppi (porous per inch). For layer 103, a polyester foam of density 27-31 kg/m3 could be used, for example having somewhat smaller cells (1080 micron-1580 micron (approximate diameter) and 45 ppi (porous per inch). This would provide for a media pack of gradient efficiency.

Still referring to FIG. 19, if media is as described, it can be understood that layers 101 and 102, which are more upstream than layer 103, could be a depth media than layer 103. This would create a gradient of increasing efficiency through the depth media from an outside to inside, facilitating load and cartridge lifetime. Alternatives, of course, are possible.

It is noted that when media layers are used, it can be provided in separate coils or wraps, or as a multi-layer coil.

It is noted that sometimes the innermost layer of media can be provided as a barrier of pleated media, such as a pleated cellulose media. This is described, for example, in U.S. Pat. No. 5,423,892, referenced above and incorporated by reference.

Figure 20:
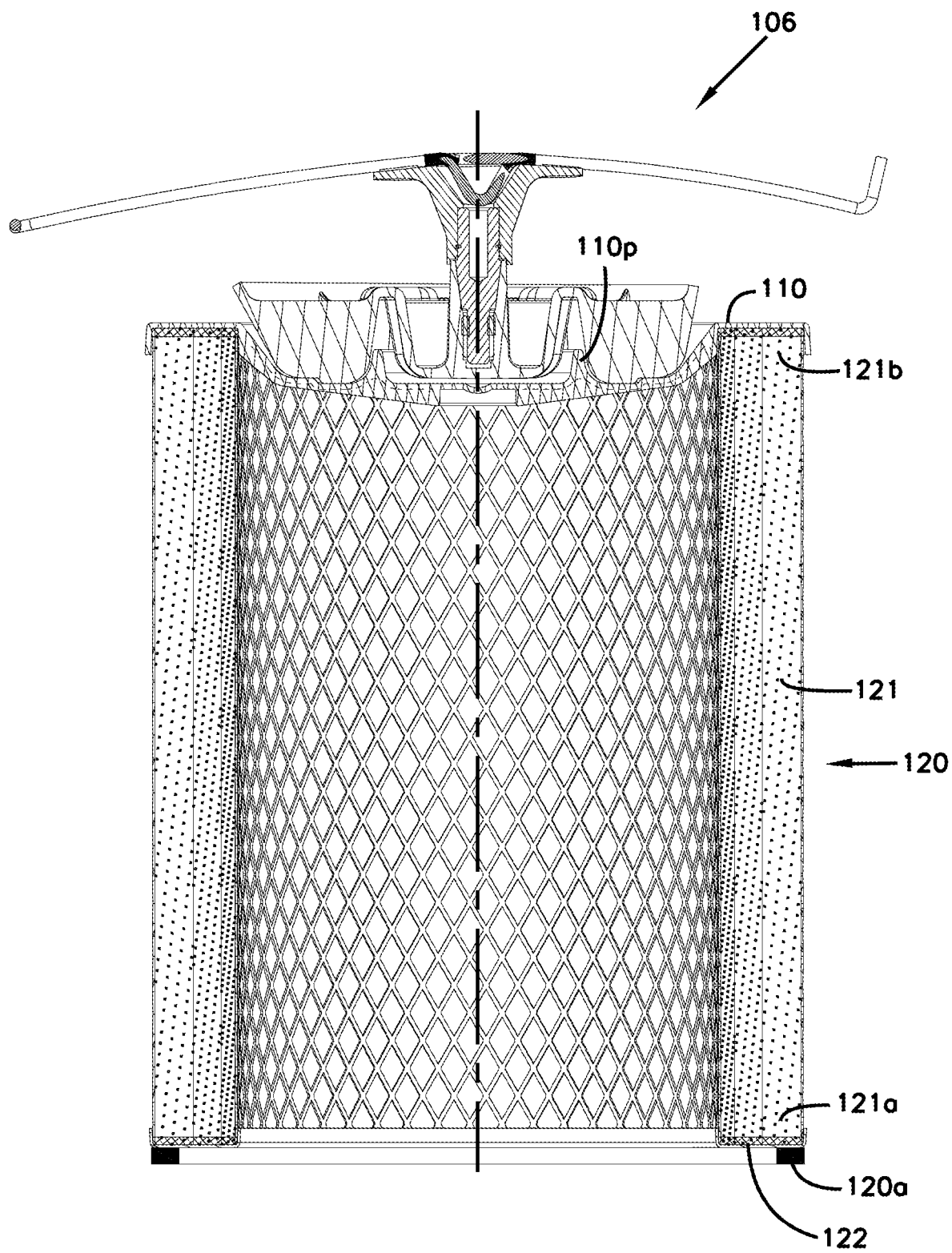
FIG. 20 is a schematic cross-sectional view of an alternate cartridge used with an adapter in accord with the present disclosure.
Figure 21:
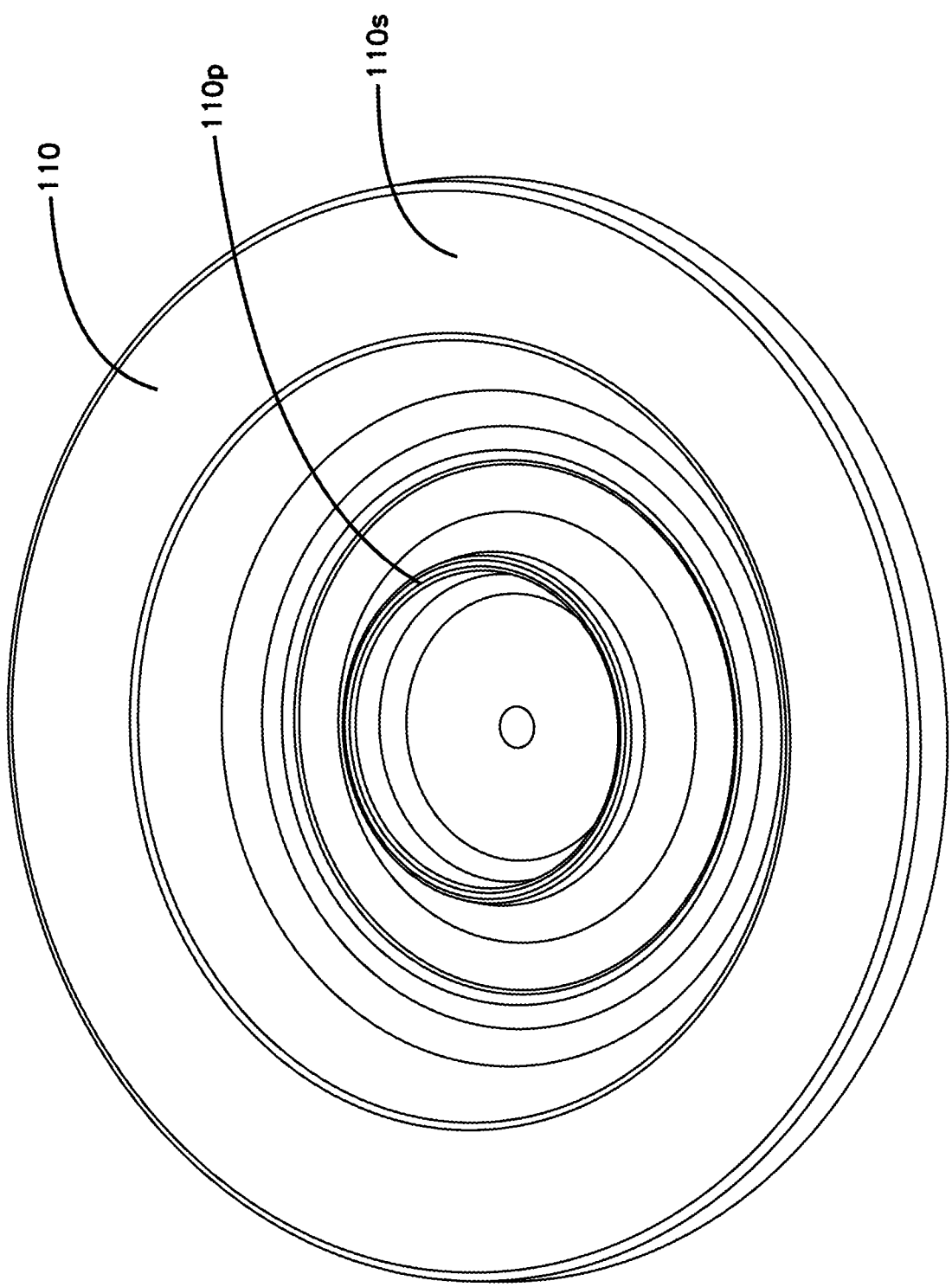
FIG. 21 is a schematic perspective view of an outer surface of a closed end cap of the cartridge of FIG. 20.
Figure 22:
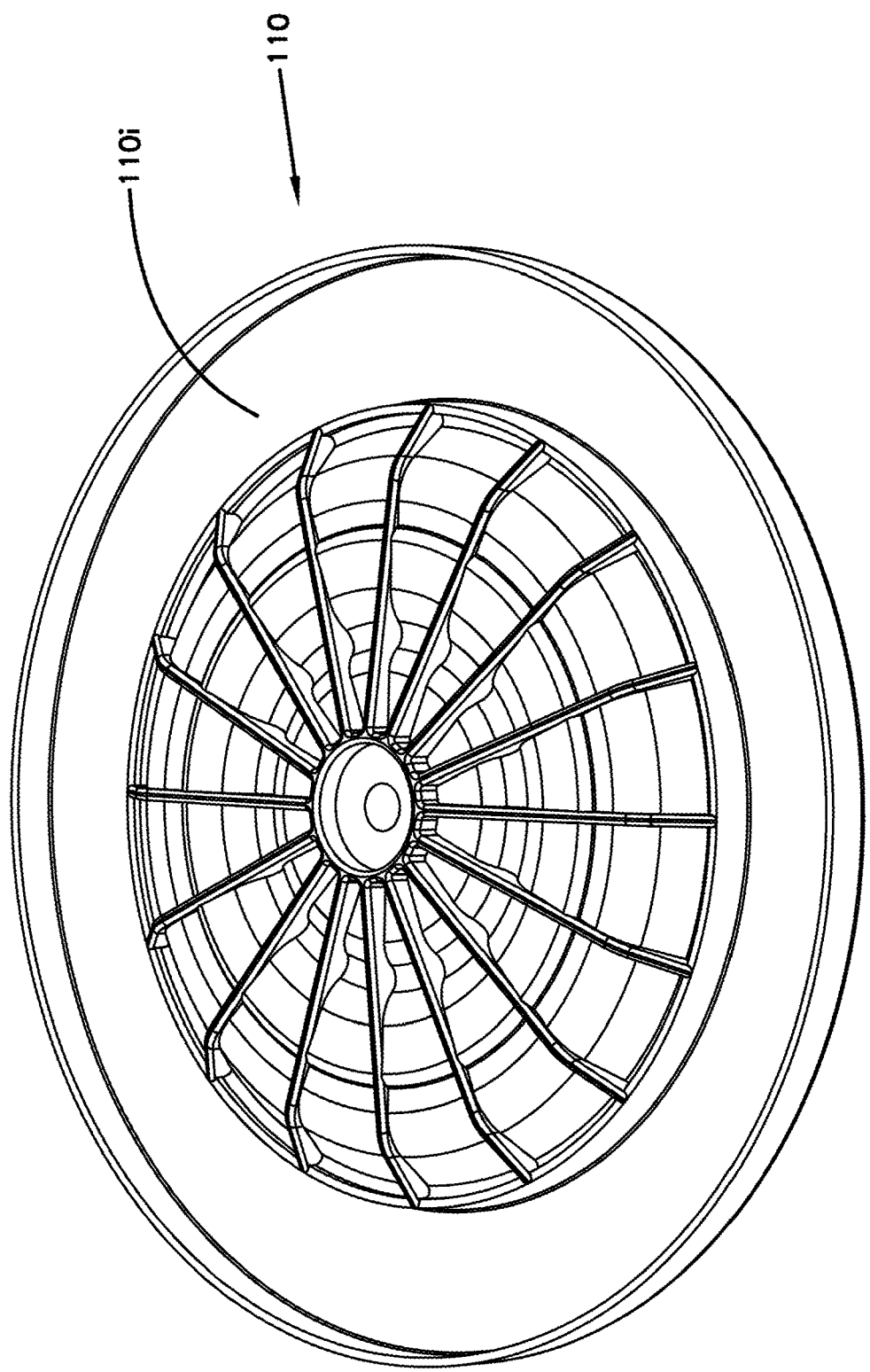
FIG. 22 is a schematic perspective view of an inner surface of a closed end cap of the cartridge of FIG. 20.

It is noted that in some instances, the cartridge may be implemented without the central projection on the closed end piece having serpentine surfaces, of the type described above. An example of such implementation is shown in the embodiments of FIGS. 20-22. Such an arrangement would not necessarily be preferred, but in the figures it is shown how such a cartridge can be used with adapters with the present disclosure.

Attention is first directed to FIG. 20, which includes an adapter 106, for example, analogous to adapter 6, FIG. 10a, used in association with a cartridge 120. It does not have a serpentine projection thereon. Referring to FIG. 20, the cartridge 120 comprises a media arrangement or media pack 121 extending between opposite ends 121b, 121a. End 121b is provided in end piece 122, generally corresponding to end piece 22, FIG. 16, comprising an open end piece and having thereon a seal arrangement 120a as previously described. At 121b is positioned a closed end piece 110 generally corresponding to closed end piece 10, except having a projection 110p thereon extending in a direction toward the adapter and way from first end 121a but which is circular, rather than serpentine. One can see from the arrangement of FIG. 20, that even though the adapter 106 has a receiver into which the projection 110p extends that is serpentine, the projection 110p is quite short, and is sufficiently short to fit the particular adapter depicted even though the projection is circular.

It is previously discussed, that in such an arrangement, a non-rotatable interaction between the adapter and the projection 110p is desired, an outer perimeter of the adapter can be made such that its interaction with the cartridge does not permit rotation. Of course, the two pieces could be configured to be rotatable relative to one another if desired.

In FIG. 21, end piece 110 is shown with projection being depicted as circular. That is, in FIG. 21, the surface 110s is viewable of the end piece 110 is an outer surface, facing away from end 120a, FIG. 20, and toward adapter 106, FIG. 20.

In FIG. 21, if desired, one or more portions of the surface 110s surrounding projection 110p can be made to mate in a non-rotating manner, with an appropriate portion of the adapter 106 as previously described.

In FIG. 21, a surface 110i of the end piece 110 opposite surface 110s, FIG. 21, is depicted. Surface 110i can be viewed as an inner surface that faces the media 121, in use.

It is noted, referencing FIG. 20, that cartridge 120 is depicted with a media 121 analogously to media and previously described embodiments, see for example, the description of FIG. 19. Thus, it can comprise multiple layers, and a gradient as described. It could be provided without multiple layers, and as alternative media, however, if desired.

From the above, it will be understood that the arrangement of FIGS. 20-22 can be implemented, however such that there is not a non-rotatable interaction between the cartridge and the adapter even though the adapter may have an appropriate surface for such a non-rotatable interaction. That is, the cartridge can be configured with appropriate radial symmetry so that a non-rotatable interaction with the adapter is not involved. However, it may be desirable to still use an adapter as characterized, to allow for options in a given system, by providing options of using: either a cartridge that will non-rotatably interact with the adapter; or, a cartridge that will rotatably interact with the adapter.

Referring now more generally to summarizing principles with respect to the features characterized in this section, it is noted that the adapter and coupling system previously characterized can be provided with similar features to those summarized in previous sections, except without features specifically calling for non-rotatable interaction between the adapter and the cartridge. Also, it will be understood that the filter assembly may be configured using a cartridge with media of the type characterized in the section, with an axial seal as characterized in this section and/or with a circular projection for non-rotatable interaction with an adapter or other feature in the housing.

It can also be understood that any of the features characterized in previous sections herein can be implemented with arrangements of the type characterized in this section, but for the variations identified.

The claims reflect portions of the current text and are incorporated herein. It reflects variations of the type summarized herein, and in previous sections.

What is claimed:

1. An air filter cartridge comprising:
   (a) a filter media pack extending between a first end and a second, opposite, end;
   (b) a closed, first end cap on the first end of the filter media pack, wherein the closed, first end cap comprises a cartridge-side coupling element of a coupling system for releasably coupling the air filter cartridge and a housing of a dedicated air filter assembly, wherein the cartridge-side coupling element comprises:
      (i) a first portion, a central projection, and a groove located between the first portion and the central projection, wherein the first portion covers at least a portion of the first end of the media pack and extends from a periphery of the first end of the media pack, the groove is surrounded by the first portion and opens in a direction away from the second end of the media pack, and the central projection is surrounded by the groove; and
      (ii) a central recess surrounded by the central projection, wherein the central recess opens in a direction away from the second end of the media pack; and
   (c) an open, second end cap on the second end of the filter media pack, wherein the open, second end cap comprises:
      (i) a first portion covering at least a portion of the second end of the filter media pack;
      (ii) an axially directed housing seal member extending from the first portion of the open, second end cap, and including a housing seal surface facing in a direction away from the closed, first end cap, and the housing seal surface is configured to form an axially directed seal with an air cleaner housing, in use; and
      (iii) a clean air outlet surrounded by the first portion and the axially directed housing seal member.

2. The air filter cartridge according to claim 1 wherein:
   (a) the filter media pack comprises open cell foam.

3. An air filter cartridge according to claim 1 wherein:
   (a) the filter media pack comprises multiple layers of media.

4. An air filter cartridge according to claim 3 wherein:
   (a) the filter media pack comprises multiple wraps of media.

5. An air filter cartridge according to claim 4 wherein:
   (a) at least two wraps of the multiple wraps of media comprise same media.

6. An air filter cartridge according to claim 3 wherein:
(a) the filter media pack is a gradient efficiency media pack.
7. The air filter cartridge according to claim 1 wherein:
(a) the filter media pack comprises pleated media.
8. The air filter cartridge according to claim 1 wherein:
(a) the filter media pack comprises pleated media arranged in a cylindrical configuration with an open interior.
9. The air filter cartridge according to claim 1 wherein:
(a) the filter media pack comprises depth media.
10. The air filter cartridge according to claim 1 wherein:
(a) the cartridge-side coupling element further comprises an outer perimeter arranged around a periphery of the media pack and extending from the first portion.
11. The air filter cartridge according to claim 1 wherein:
(a) the first portion comprises a flat surface arranged as a ring around the groove.
12. The air filter cartridge according to claim 1 wherein:
(a) the groove is formed by an inner wall, a bottom, and the central projection.
13. The air filter cartridge according to claim 12 wherein:
(a) the groove comprises a plurality of ribs extending along the inner wall.
14. The air filter cartridge according to claim 1 wherein:
(a) the central projection comprises a wall having an outer surface and an inner surface, wherein the outer surface of the wall forms part of the groove, and the inner surface of the wall forms part of the central recess.
15. The air filter cartridge according to claim 1 wherein:
(a) the wall of the central projection has a serpentine configuration.
16. The air filter cartridge according to claim 1 wherein:
(a) the wall of the central projection is continuous.
17. The air filter cartridge according to claim 1 wherein:
(a) the wall of the central projection is non-continuous.
18. The air filter cartridge according to claim 14 wherein:
(a) the inner surface comprises a plurality of alternating convex section and concave section, and the outer wall comprises a plurality of alternating convex section and concave section.
19. The air filter cartridge according to claim 14 wherein:
(a) the wall of the central projection has a depth that is greater than a depth from the first portion to the central recess.
20. The air filter cartridge according to claim 1 wherein:
(a) the seal member comprises a gasket secured to the first portion of the open, second end cap.
21. The air filter cartridge according to claim 1 wherein:
(a) the housing seal surface of the axially directed housing seal member is provided as a flat surface.
22. A combination air filter cartridge and coupling system comprising:
an air filter cartridge comprising:
(a) a filter media pack extending between a first end and a second, opposite, end;
(b) a closed, first end cap on the first end of the filter media pack, wherein the closed, first end cap comprises a cartridge-side coupling element of a coupling system for releasably coupling the air filter cartridge and a housing of a dedicated air filter assembly, wherein the cartridge-side coupling element comprises:
(i) a first portion, a central projection, and a groove located between the first portion and the central projection, wherein the first portion covers at least a portion of the first end of the media pack and extends from a periphery of the first end of the media pack, the groove is surrounded by the first portion and opens in a direction away from the second end of the media pack, and the central projection is surrounded by the groove; and
(ii) a central recess surrounded by the central projection and opens in a direction away from the second end of the media pack; and
(c) an open, second end cap on the second end of the filter media pack, wherein the open, second end cap comprises:
(i) a first portion covering at least a portion of the second end of the filter media pack; and
(ii) an axially directed housing seal member extending from the first portion of the open, second end cap, and including a housing seal surface facing in a direction away from the closed, first end cap, and the housing seal surface is configured to form an axially directed seal with an air cleaner housing, in use; and
(iii) a clean air outlet surrounded by the first portion and the axially directed housing seal member; and
an adapter comprising a first surface configured to face the housing-side coupling element of the coupling system when combined with the air filter cartridge, and a second surface configured to face away from the cartridge-side coupling element of the coupling system when combined with the air filter cartridge.
23. The combination air filter cartridge and coupling system according to claim 22 wherein:
(a) the second surface of the adapter comprises a three-dimensional structure comprising a groove arranged between a first projection and a second projection, wherein the groove of the second surface of the adapter is configured to receive the central projection of the cartridge-side coupling element.
24. The combination air filter cartridge and coupling system according to claim 23 wherein:
(a) the groove of the second surface of the adapter comprises a serpentine shape.
25. The combination air filter cartridge and coupling system according to claim 22 wherein:
(a) the filter media pack comprises open cell foam.
26. The combination air filter cartridge and coupling system according to claim 22 wherein:
(a) the filter media pack comprises multiple layers of media.
27. The combination air filter cartridge and coupling system according to claim 22 wherein:
(a) the filter media pack comprises multiple wraps of media.
28. The combination air filter cartridge and coupling system according to claim 27 wherein:
(a) at least two wraps of the multiple wraps of media comprise the same media.
29. The combination air filter cartridge and coupling system according to claim 22 wherein:
(a) the filter media pack is a gradient efficiency media pack.
30. The combination air filter cartridge and coupling system according to claim 22 wherein:
(a) the filter media pack comprises pleated media.
31. The combination air filter cartridge and coupling system according to claim 22 wherein:
(a) the filter media pack comprises pleated media arranged in a cylindrical configuration with an open interior.

32. The combination air filter cartridge and coupling system according to claim 22 wherein:
  (a) the filter media pack comprises depth media.

33. The combination air filter cartridge and coupling system according to claim 22 wherein:
  (a) the cartridge-side coupling element of the air filter cartridge further comprises an outer perimeter arranged around a periphery of the media pack and extending from the first portion.

34. The combination air filter cartridge and coupling system according to claim 22 wherein:
  (a) the first portion comprises a flat surface arranged as a ring around the groove of the cartridge-side coupling element of the air filter cartridge.

35. The combination air filter cartridge and coupling system according to claim 22 wherein:
  (a) the groove of the cartridge cartridge-side coupling element comprises an inner wall, a bottom, and the central projection.

36. The combination air filter cartridge and coupling system according to claim 35 wherein:
  (a) the groove of the cartridge-side coupling element comprises a plurality of ribs extending along the inner wall.

37. The combination air filter cartridge and coupling system according to claim 22 wherein:
  (a) the central projection comprises a wall having an outer surface and an inner surface, wherein the outer surface of the wall forms part of the groove, and the inner surface of the wall forms part of the central recess.

38. The combination air filter cartridge and coupling system according to claim 37 wherein:
  (a) the wall of the central projection has a serpentine configuration.

39. The combination air filter cartridge and coupling system according to claim 37 wherein:
  (a) the wall of the central projection is continuous.

40. The combination air filter cartridge and coupling system according to claim 37 wherein:
  (a) the wall of the central projection is non-continuous.

41. The combination air filter cartridge and coupling system according to claim 37 wherein:
  (a) the inner surface comprises a plurality of alternating convex section and concave section, and the outer wall comprises a plurality of alternating convex section and concave section.

42. The combination air filter cartridge and coupling system according to claim 37 wherein:
  (a) the wall of the central projection has a depth that is greater than a depth from the first portion to the central recess.

43. The combination air filter cartridge and coupling system according to claim 22 wherein:
  (a) the seal member comprises a gasket secured to the first portion of the open, second end cap.

44. The combination air filter cartridge and coupling system according to claim 22 wherein:
  (a) the housing seal surface of the axially directed housing seal member is provided as a flat surface.

* * * * *